(12) United States Patent
Tsuchida et al.

(10) Patent No.: US 11,688,355 B2
(45) Date of Patent: Jun. 27, 2023

(54) LIGHTING CONTROL DATA GENERATION METHOD AND LIGHTING CONTROL DATA GENERATION DEVICE

(71) Applicant: NIPPON SEIKI CO., LTD., Niigata (JP)

(72) Inventors: Kiyoshi Tsuchida, Niigata (JP); Yasuhiro Yamakawa, Niigata (JP); Masanori Endo, Niigata (JP); Takashi Ishikawa, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 17/909,888

(22) PCT Filed: Mar. 16, 2021

(86) PCT No.: PCT/JP2021/010538
§ 371 (c)(1),
(2) Date: Sep. 7, 2022

(87) PCT Pub. No.: WO2021/187461
PCT Pub. Date: Sep. 23, 2021

(65) Prior Publication Data
US 2023/0110727 A1 Apr. 13, 2023

(30) Foreign Application Priority Data
Mar. 17, 2020 (JP) ................. 2020-046977

(51) Int. Cl.
*G09G 3/34* (2006.01)
*G02B 27/01* (2006.01)

(52) U.S. Cl.
CPC ....... *G09G 3/3406* (2013.01); *G02B 27/0101* (2013.01); *G09G 2360/145* (2013.01); *G09G 2380/10* (2013.01)

(58) Field of Classification Search
None
See application file for complete search history.

(56) References Cited

U.S. PATENT DOCUMENTS 10,319,272 B1 * 6/2019 Carter .................. G06F 3/012
2011/0051128 A1   3/2011 Horibe
(Continued)

FOREIGN PATENT DOCUMENTS

JP   2013-524523 A   6/2013
JP   2016-04121 A    1/2016
(Continued)

OTHER PUBLICATIONS

International Search Report issued in corresponding International Application No. PCT/JP2021/010538, dated May 25, 2021, w/ English Translation (5 pages).

*Primary Examiner* — Fred Tzeng
(74) *Attorney, Agent, or Firm* — McDermott Will & Emery LLP

(57) ABSTRACT

A lighting control data generation method for generating lighting control data for controlling light sources in a HUD device includes: a measurement point specifying step for specifying measurement points in accordance with the brightness of light from a light source at each of output levels set to different values by a light source control unit which controls the light source with reference to lighting control data; and an output characteristic acquisition step for acquiring output characteristics by performing interpolation between the specified measurement points, wherein in the measurement point specification step, measurement points of a first specific point number are specified in a high-brightness mode in which the required brightness exceeds a threshold value, and measurement points of a second specific point number larger than the first specific point number (Continued)

are specified in a low-brightness mode in which the required brightness is the threshold value or low.

6 Claims, 23 Drawing Sheets

(56) References Cited

U.S. PATENT DOCUMENTS

| | | | | |
|---|---|---|---|---|
| 2011/0241545 A1* | 10/2011 | Miller | ............ | B60Q 3/18 |
| | | | | 315/82 |
| 2011/0241572 A1 | 10/2011 | Zhang et al. | | |
| 2014/0152711 A1* | 6/2014 | Sekiya | ............ | H04N 9/3194 |
| | | | | 345/690 |
| 2015/0019072 A1* | 1/2015 | Dara, Jr. | ............ | G02B 27/0101 |
| | | | | 701/36 |
| 2015/0022898 A1* | 1/2015 | Yamakawa | ............ | G02B 27/0149 |
| | | | | 356/230 |
| 2015/0057880 A1* | 2/2015 | Murzyn | ............ | G02B 27/01 |
| | | | | 701/36 |
| 2016/0109701 A1* | 4/2016 | Goldman-Shenhar | ............ | |
| | | | | G02B 27/01 |
| | | | | 345/8 |
| 2016/0139416 A1* | 5/2016 | Yamakawa | ............ | G09G 3/003 |
| | | | | 359/634 |
| 2017/0098400 A1* | 4/2017 | Yamakawa | ............ | G02B 27/01 |
| 2017/0280094 A1* | 9/2017 | Ito | ............ | G03B 21/14 |
| 2018/0067308 A1* | 3/2018 | Sakai | ............ | H04N 9/3155 |
| 2018/0197493 A1* | 7/2018 | Yamakawa | ............ | G02B 27/0101 |
| 2018/0199013 A1* | 7/2018 | Wu | ............ | G03B 21/2013 |
| 2018/0211440 A1* | 7/2018 | Kunkel | ............ | G09G 3/00 |
| 2019/0339605 A1* | 11/2019 | Asuma | ............ | G03B 21/16 |
| 2019/0361235 A1* | 11/2019 | Fukushima | ............ | B60K 35/00 |
| 2019/0385513 A1* | 12/2019 | Iguchi | ............ | G09F 9/00 |
| 2020/0026069 A1* | 1/2020 | Nicholson | ............ | G09G 3/02 |
| 2020/0029410 A1* | 1/2020 | Umezawa | ............ | H04N 5/74 |

FOREIGN PATENT DOCUMENTS

| | | |
|---|---|---|
| JP | 2017-146401 A | 8/2017 |
| JP | 2021-21912 A | 2/2021 |
| WO | 2010/084983 A1 | 7/2010 |
| WO | 2018/101121 A1 | 6/2018 |
| WO | 2018/123554 A1 | 7/2018 |

* cited by examiner

LIGHTING CONTROL DATA GENERATION METHOD AND LIGHTING CONTROL DATA GENERATION DEVICE

CROSS REFERENCE TO RELATED APPLICATIONS

This application is the U.S. National Phase under 35 U.S.C. § 371 of International Application No. PCT/JP2021/010538, filed on Mar. 16, 2021, which claims the benefit of Japanese Application No. 2020-046977, filed on Mar. 17, 2020, the entire contents of each are hereby incorporated by reference.

TECHNICAL FIELD

The present disclosure relates to a lighting control data generation method and a lighting control data generation device.

BACKGROUND ART

For example, the head-up display device described in Patent Document 1 reads lighting control data stored in a storage unit on the basis of an illuminance signal from an illuminance sensor that detects illuminance around a user, and adjusts the luminance of a display image by changing the output of a light source. This lighting control data is generated by calibrating at the time of manufacture in consideration of individual differences in the light source of a lighting device.

PRIOR ART DOCUMENT

Patent Document

Patent Document 1: Japanese Unexamined Patent Application Publication No. 2016-4121

SUMMARY OF THE INVENTION

Problems to be Solved by the Invention

In the configuration described in Patent Document 1 above, the time required to generate the lighting control data is long.

The present disclosure has been made in view of the above circumstances, and an object of the present disclosure is to provide a lighting control data generation method and a lighting control data generation device that can shorten the time required to generate lighting control data.

Solution to Problem

In order to achieve the above object, a lighting control data generation method according to a first aspect of the present disclosure is a lighting control data generation method for generating lighting control data for controlling a plurality of light sources in a head-up display device, and includes a measurement point specification step in which a measurement point specification unit specifies a plurality of measurement points in accordance with a luminance of light emitted by the light sources at each of a plurality of output levels set to mutually different values by a light source control unit that controls the light sources with reference to the lighting control data, and an output characteristic acquisition step in which an output characteristic acquisition unit acquires output characteristics by interpolating between the specified plurality of measurement points. In the measurement point specification step, when a required luminance exceeds a threshold value, a first specified number of measurement points are specified, and when the required luminance is less than or equal to the threshold value, a second specified number of measurement points that are larger than the first specified number of measurement points are specified.

In order to achieve the above object, a lighting control data generation device according to a second aspect of the present disclosure is a lighting control data generation device for generating lighting control data for controlling a plurality of light sources in a head-up display device, and includes a measurement point specification unit that specifies a plurality of measurement points in accordance with a luminance of light emitted by the light sources at each of a plurality of output levels set to mutually different values by a light source control unit that controls the light sources with reference to the lighting control data, and an output characteristic acquisition unit that acquires output characteristics by interpolating between the specified plurality of measurement points. When a required luminance exceeds a threshold value, the measurement point specification unit specifies a first specified number of measurement points, and when the required luminance is less than or equal to the threshold value, the measurement point specification unit specifies a second specified number of measurement points that are larger than the first specified number of measurement points.

Effect of the Invention

According to the present disclosure, the time required to generate the lighting control data can be reduced.

MODE FOR CARRYING OUT THE INVENTION

One embodiment of a lighting control data generation method, a lighting control data generation device, and a head-up display device (hereinafter referred to as a HUD device) according to the present disclosure will be described with reference to the drawings.

Figure 1:
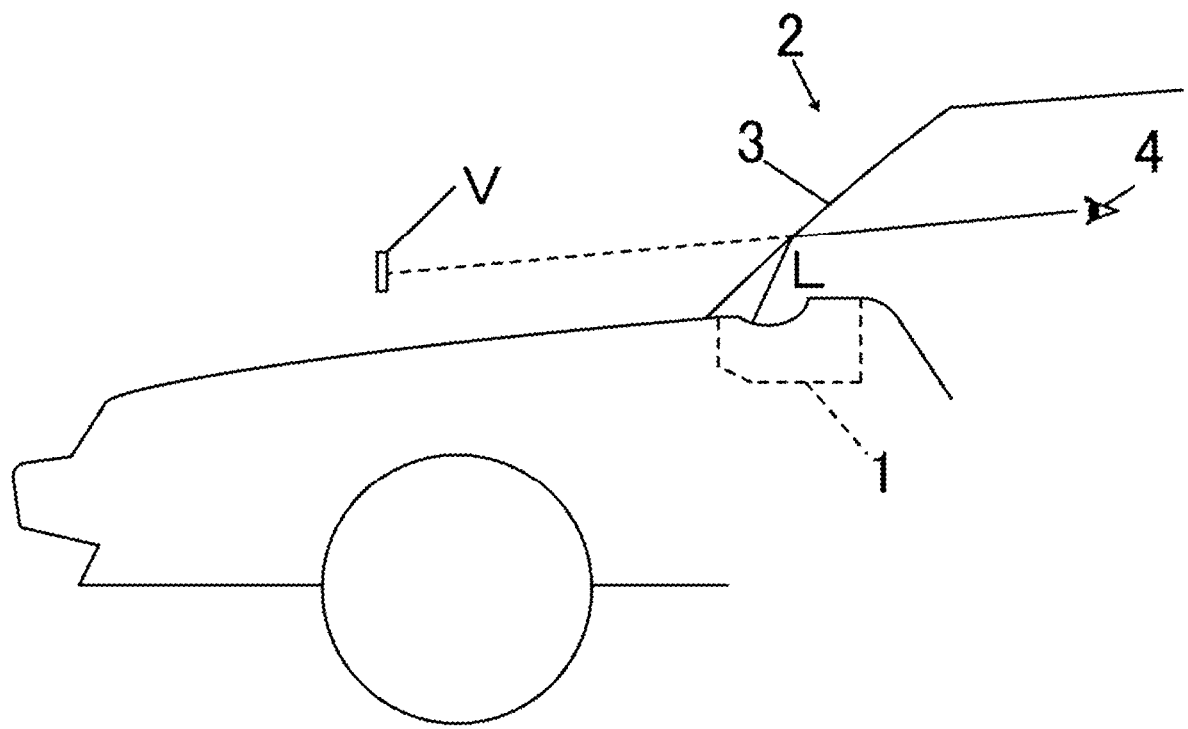
FIG. 1 is a pattern diagram of a vehicle on which a head-up display device according to an embodiment of the present disclosure is mounted.

As illustrated in FIG. 1, a HUD device 1 is mounted on the dashboard of a vehicle 2 to emit display light L representing an image and emits the generated display light L toward a windshield 3. The display light L is reflected by the windshield 3 and then reaches a viewer 4 (e.g., the driver of the vehicle 2). This allows the viewer 4 to see a virtual image V displayed in front of the windshield 3. The virtual image V displays various vehicle information, for example, engine speed, vehicle speed, and the like.

Figure 2:
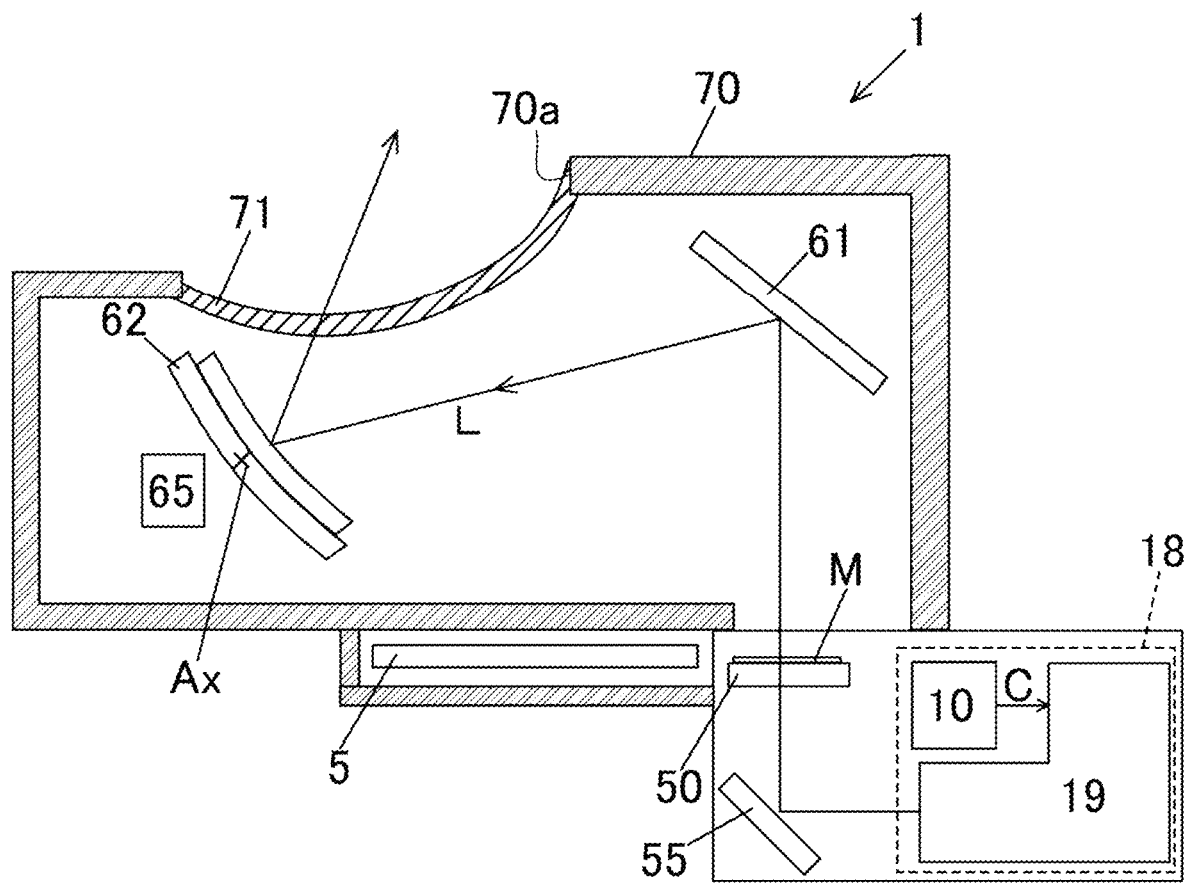
FIG. 2 is a schematic diagram of the head-up display device according to the embodiment of the present disclosure.

As illustrated in FIG. 2, the HUD device 1 includes a projector device 18, a transmissive screen 50, a light source drive device 5, plane mirrors 55 and 61, a concave mirror 62, a concave mirror drive unit 65, a housing 70, and a light transmission section 71. The projector device 18 includes a lighting device 10 that emits illumination light C and a display unit 19 that receives the illumination light C and emits display light L.

The housing 70 is box-shaped, for example, made of light-shielding material. The housing 70 houses a plane mirror 61, a concave mirror 62, and a concave mirror drive unit 65. The housing 70 has an opening 70a through which the display light L passes.

The light transmission section 71 is formed in the shape of a curved plate made of a light transmissive resin such as acrylic, and is provided so as to close the opening 70a of the housing 70.

Figure 3:
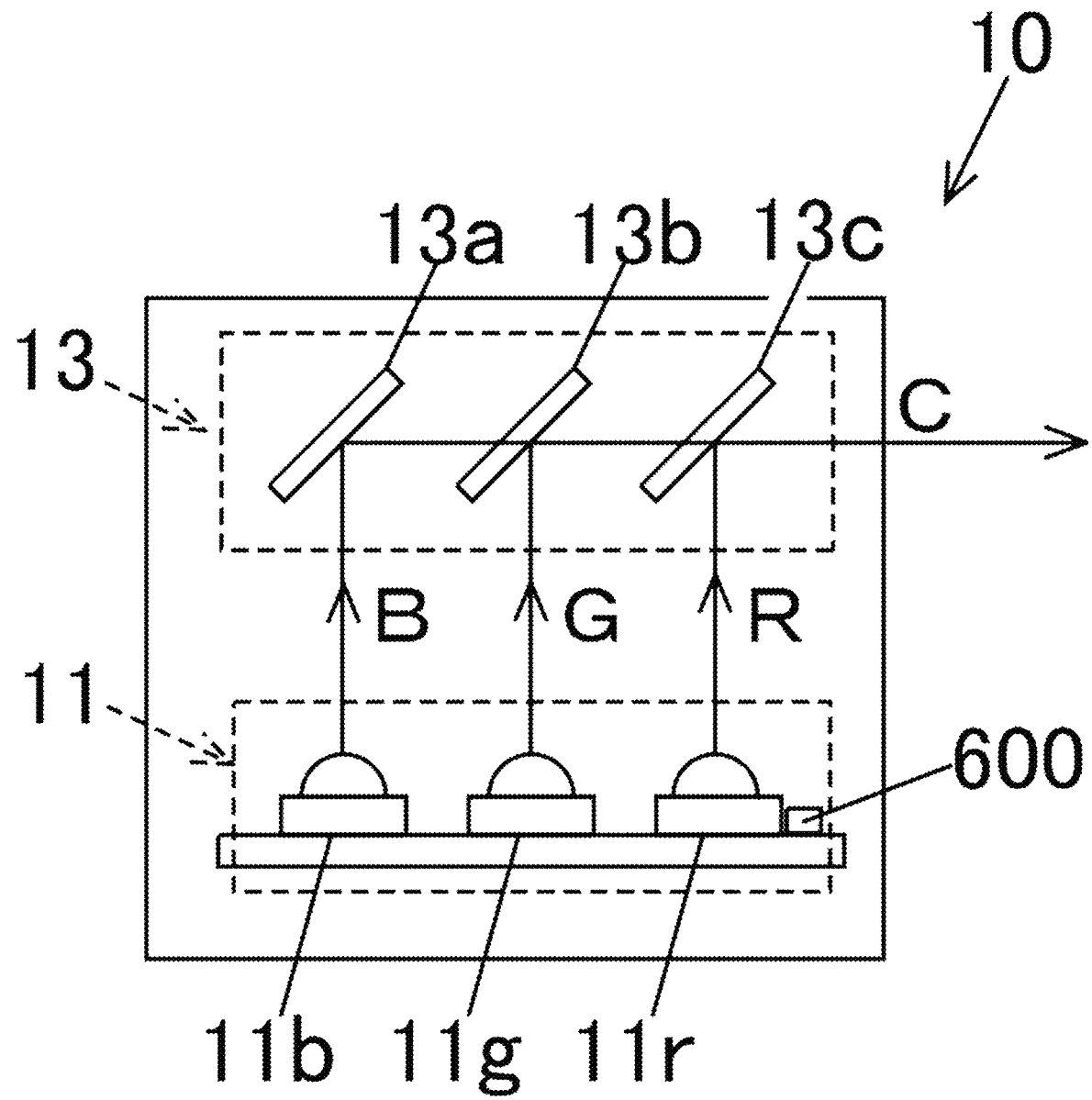
FIG. 3 is a schematic diagram of a lighting device according to the embodiment of the present disclosure.

The lighting device 10 generates the illumination light C and emits the generated illumination light C toward the display unit 19. Specifically, as illustrated in FIG. 3, the lighting device 10 includes a light source group 11, a light combining unit 13, and a light source temperature detection unit 600.

The light source group 11 is configured with three light sources 11r, 11g, and 11b, for example, each consisting of LED (Light Emitting Diode). The light source 11r is a red light source and emits red light R. The light source 11g is a green light source and emits green light G. The light source 11b is a blue light source and emits blue light B. Each of the light sources 11r, 11g, and 11b is driven by the light source drive device 5 to emit light with a predetermined light intensity and at a predetermined timing.

Figure 5:
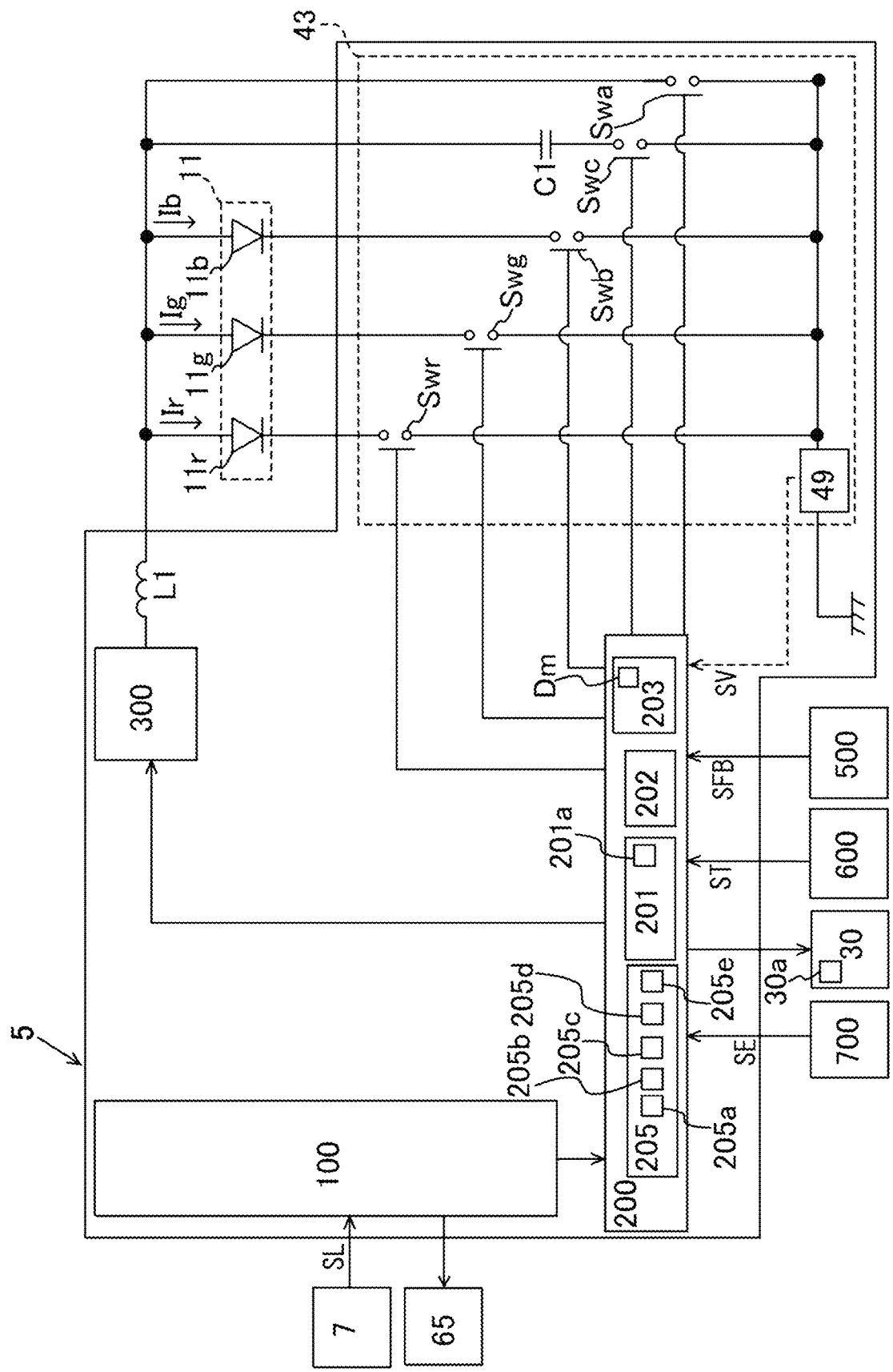
FIG. 5 is a block diagram of a light source drive device according to the embodiment of the present disclosure.

The light combining unit 13 matches the optical axes of the red light R, the green light G, and the blue light B, which are sequentially emitted from the light sources 11r, 11g, and 11b, to generate the illumination light C and emits the generated illumination light C toward the display unit 19. Specifically, the light combining unit 13 includes a reflective mirror 13a and dichroic mirrors 13b and 13c that reflect light of a specific wavelength and transmit light of other wavelengths other than the specific wavelength. The reflective mirror 13a reflects the incident blue light B toward the dichroic mirror 13b. The dichroic mirror 13b reflects the incident green light G toward the dichroic mirror 13c while transmitting the blue light B from the reflective mirror 13a without change. The dichroic mirror 13c reflects the incident red light R toward the display unit 19 while transmitting the green light G and the blue light B from the dichroic mirror 13b. As a result, the dichroic mirror 13c emits the illumination light C, which is the combination of the red light R, the green light G, and the blue light B on the same optical axis, toward the display unit 19. The light source temperature detection unit 600 detects the temperature of each light source 11r, 11g, and 11b, and outputs the detection result to the light source drive device 5 as a light source temperature signal ST, as illustrated in FIG. 5.

Figure 4:
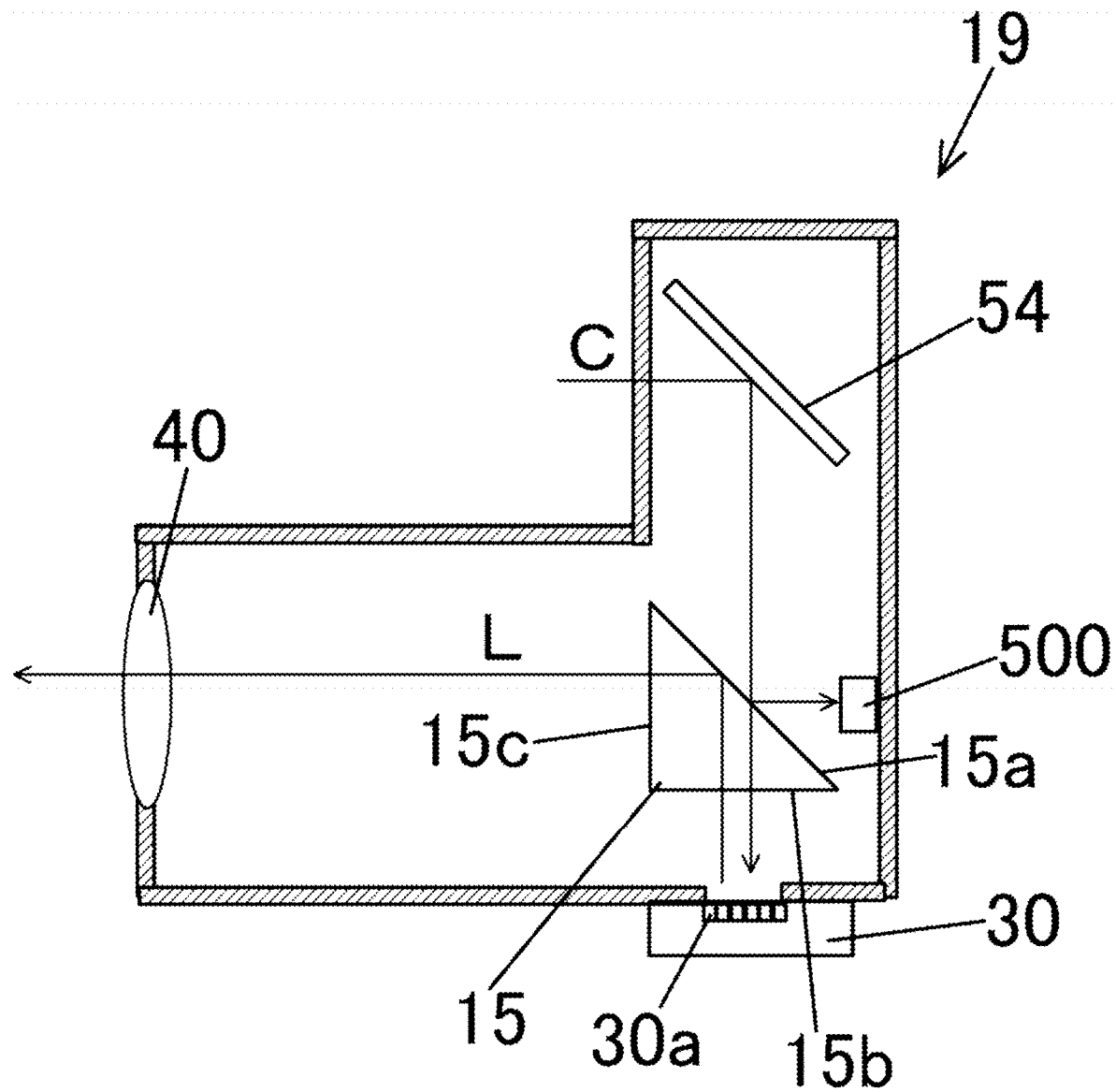
FIG. 4 is a schematic diagram of a display unit according to the embodiment of the present disclosure.

As illustrated in FIG. 4, the display unit 19 includes a prism 15, a light intensity detection unit 500, a DMD (Digital Micro mirror Device) display element 30, a projection optical system 40, and a plane mirror 54.

The plane mirror 54 reflects the illumination light C from the lighting device 10 toward the prism 15.

The prism 15 is formed in the shape of a right-angled isosceles triangular prism made of light transmissive material. The prism 15 includes an inclined surface 15a facing the plane mirror 54, an orthogonal surface 15b facing the DMD display element 30, and an orthogonal surface 15c facing the projection optical system 40. The illumination light C from the plane mirror 54 reaches the inclined surface 15a of the prism 15. The inclined surface 15a causes most of the illumination light C from the plane mirror 54 to enter the prism 15 and reflects part of the illumination light C from the plane mirror 54 toward the light intensity detection unit 500. The illumination light C having entered the prism 15 is emitted toward the DMD display element 30 from the orthogonal surface 15b of the prism 15. The display light L from the DMD display element 30 enters the prism 15 through the orthogonal surface 15b and is then reflected toward the inclined surface 15a. Then, the display light L reflected at the inclined surface 15a is emitted from the orthogonal surface 15c toward the projection optical system 40.

The DMD display element 30 includes a plurality of movable micromirrors 30a. The plurality of micromirrors 30*a* are arranged in a matrix to correspond to the pixels of an image M (see FIG. 2). The micromirrors 30*a* include an electrode (not illustrated), and can be turned ON or OFF by switching the voltage value applied to this electrode. The micromirrors 30*a* reflect the illumination light C toward the transmissive screen 50 when in the ON state. The micromirrors 30*a* reflect the illumination light C in a direction different from the transmissive screen 50 when in the OFF state.

Each micromirror 30*a* is switched between the ON and OFF states by the light source drive device 5 to produce the luminance and color in each pixel of the image M on the basis of a desired color, for example, white illumination light C. Under the control of the light source drive device 5, the DMD duty ratio which is the period during which the micromirror 30*a* is turned to the ON state in one frame is adjusted, and each micromirror 30*a* thereby adjusts the luminance in each pixel of the image M.

The light intensity detection unit 500 includes a light receiving element having a photodiode, for example, and is installed at a position to receive the illumination light C reflected by the prism 15. The light intensity detection unit 500 receives a portion of the illumination light C and detects the light intensity of each of the lights R, G, and B constituting the illumination light C in a time-division manner. As illustrated in FIG. 5, the light intensity detection unit 500 outputs the detection result as a light intensity detection signal SFB to a second control unit 200 described below of the light source drive device 5.

As illustrated in FIG. 4, the projection optical system 40 is configured with a concave lens or a convex lens, or the like, to enlarge the display light L that passes through the prism 15 from the DMD display element 30 and emit the enlarged display light L to the plane mirror 55 illustrated in FIG. 2. The plane mirror 55 reflects the display light L toward the transmissive screen 50. As illustrated in FIG. 2, the transmissive screen 50 is configured with a holographic diffuser, a microlens array, a diffusion plate, and the like, to receive the display light L from the projection optical system 40 and display the image M.

The plane mirror 61 reflects the display light L representing the image M displayed on the transmissive screen 50 toward the concave mirror 62. This plane mirror 61 may be a concave mirror.

The concave mirror 62 reflects the display light L from the plane mirror 61 toward the windshield 3. The display light L passes through the light transmission section 71 of the housing 70 and is reflected by the windshield 3 toward the viewer 4.

The concave mirror drive unit 65 includes a motor and a gear mechanism that transmits the motor's driving force to the concave mirror 62 (none of which is illustrated). The concave mirror drive unit 65 rotates the concave mirror 62 about a rotation axis Ax that extends vertically on the plane of FIG. 2. By rotating the concave mirror 62 about the rotation axis Ax, the irradiation position of the display light L to the viewer 4 is adjusted in the height direction.

As illustrated in FIG. 5, the light source drive device 5 includes a light source driver 300 that supplies a constant current to the light source group 11, an inductor L1, a light source drive unit 43 that drives the light source group 11, a second control unit 200 that controls the light source drive unit 43, the DMD display element 30, and the like, and a first control unit 100 that controls the concave mirror drive unit 65 and the like.

The light source driver 300 includes a constant-current driver IC (Integrated Circuit) that generates a constant current on the basis of the power from an onboard battery (not illustrated), and is controlled by the second control unit 200.

The light source driver 300 supplies a constant current to the light source group 11 on the basis of an instruction signal from the second control unit 200. When receiving an instruction signal from the second control unit 200 to turn off the light source driver 300 from the second control unit 200, the light source driver 300 stops the supply of the constant current. The inductor L1 is connected between the light source driver 300 and the light source group 11.

The light source drive unit 43 includes switch sections Swr, Swg, Swb, Swc, and Swa, a capacitor C1, and a voltage detection unit 49.

The switch sections Swr, Swg, Swb, Swc, and Swa include, for example, n-type channel FET (Field Effect Transistor) with n-type channels, and switch between the ON (closed) and OFF (open) states under the control of the second control unit 200.

The switch section Swr is connected in series with the light source 11*r*. The switch section Swg is connected in series with the light source 11*g*. The switch section Swb is connected in series with the light source 11*b*. The switch section Swc and the capacitor C1 are connected in series to each other, and are connected in parallel to the switch sections Swr, Swg, and Swb.

The switch sections Swr, Swg, and Swb switch to the ON state to pass a current from the light source driver 300 to the corresponding light sources 11*r*, 11*g*, and 11*b*, and light up the corresponding light sources 11*r*, 11*g*, and 11*b*. By switching to the OFF state, the switch sections Swr, Swg, and Swb cut off the current from the light source driver 300 to the corresponding light sources 11*r*, 11*g*, and 11*b*, and turn off the corresponding light sources 11*r*, 11*g*, and 11*b*. The switch section Swa has a function of controlling the inductor current flowing from the light source driver 300 to the inductor L1 to a target value by switching to the ON state.

The switch section Swc has a function of adjusting the slope of the rising portion of the pulse P (see FIG. 19) described below by passing a current from the light source driver 300 to the capacitor C1 by switching to the ON state.

The voltage detection unit 49 is connected between the ground and the switch sections Swr, Swg, Swb, Swc, and Swa, detects a voltage detection signal SV, and then outputs the voltage detection signal SV to the second control unit 200.

As illustrated in FIG. 5, the first control unit 100 includes a microcontroller equipped with a CPU (Central Processing Unit), a memory, and the like, and controls the concave mirror drive unit 65. In the first control unit 100, a required luminance signal SL indicating the light intensity of the ambient light around the vehicle 2 detected through the illuminance sensor 7 SL is input. The first control unit 100 outputs the required luminance signal SL indicating the input required luminance to the second control unit 200.

The second control unit 200 is an LSI (Large Scale Integration) that performs a desired function in hardware and that includes, for example, an ASIC (Application Specific Integrated Circuit), FPGA (Field Programmable Gate Array), or the like.

In the second control unit 200, a video signal SE for displaying the image M from a video signal input unit 700, the light source temperature signal ST detected by the light source temperature detection unit 600, the voltage detection signal SV detected by the voltage detection unit 49, and the light intensity detection signal SFB detected by the light intensity detection unit 500 are input.

The second control unit 200 includes a light source control unit 201 that sets the light intensity of the illumination light C according to a required luminance, a display element control unit 202 that controls the DMD display element 30, and a storage unit 203 that stores lighting control data Dm, and a product data generation unit 205 that corrects the lighting control data Dm. The product data generation unit 205 includes a drive capability determination unit 205a, a master data selection unit 205b, a measurement point specification unit 205c, an output characteristic acquisition unit 205d, and a data correction unit 205e.

The display element control unit 202 displays the image M by controlling ON/OFF of each micromirror 30a in the DMD display element 30 on the basis of the video signal SE.

Figure 13:
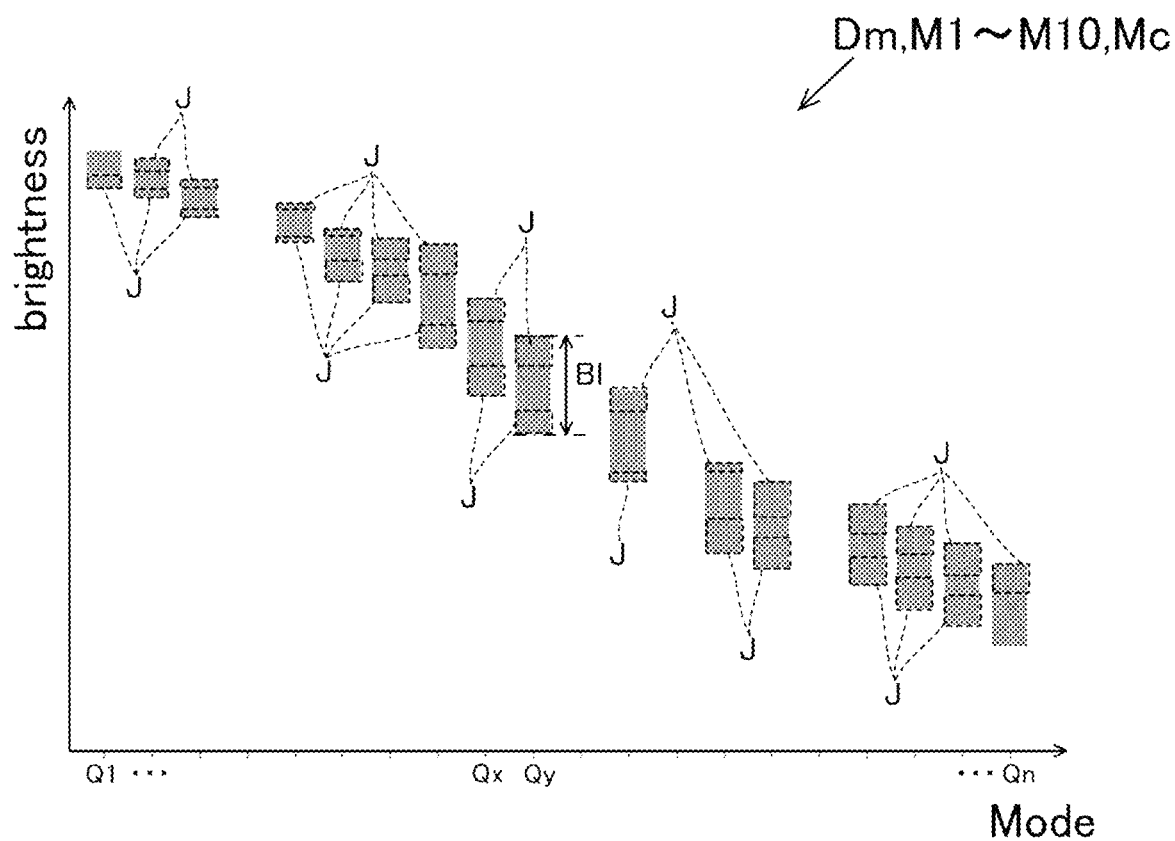
FIG. 13 is a graph illustrating a relation between control mode and luminance according to the embodiment of the present disclosure.

As illustrated in FIG. 13, the lighting control data Dm includes data indicating a luminance range Bl in each control mode Q1 to Qn (n is a given natural number). The luminance range Bl of each control mode Q1 to Qn is the luminance range for emitting a desired color, for example, white illumination light C, from the projector device 18. The median value of the luminance range Bl of control modes Q1 to Qn becomes smaller as approaching the control mode Qn. The control modes Q1 to Qn include information on which of the low-luminance mode and the high-luminance mode the control modes Q1 to Qn respectively are, a gain set by the gain setting unit 201a described below, a target value (limit value) of the current supplied to the light sources 11r, 11g, and 11b, a lighting-up pattern including the duty ratio of the light sources 11r, 11g, and 11b, RGB output characteristics described below, and the like. For example, the gain and target values are set smaller as approaching the control mode Qn from the control mode Q1. For example, when the mode switches between a control mode Qx and a control mode Qy, the mode switches between the low-luminance mode and high-luminance mode.

The lighting control data Dm is set for each light source temperature. As an example, lighting control data Dm corresponding to each of −40° C., −30° C., −10° C., 10° C., 25° C., 40° C., 50° C., 60° C., and 70° C. is prepared. The lighting control data Dm differs in the number and content of the control modes Q1 to Qn and the luminance range Bl in each control mode Q1 to Qn for each light source temperature.

As illustrated in FIG. 5, the light source control unit 201 includes, for example, a PMIC (Power Management Integrated Circuit) that controls the power supplied to the light source group 11. The light source control unit 201 refers to the lighting control data Dm relating to the temperature closest to the light source temperature on the basis of the light source temperature signal ST detected by the light source temperature detection unit 600. The light source control unit 201 shifts to the control modes Q1 to Qn that achieve the required luminance based on the required luminance signal SL with reference to the lighting control data Dm, and supplies a current to the light source group 11 via the light source driver 300 in the shifted control modes Q1 to Qn. As a result, the illumination light C has a luminance according to the required luminance signal SL. The output level of the light source control unit 201 is variable. The higher the output level of the light source control unit 201, the higher the peak value of the light source current Pk (see FIG. 18 and FIG. 19), and the time until the light source current reaches the target value is short, that is, the slope of the increase in the light source current becomes large.

For example, the light source control unit 201 determines the target value on the basis of the required luminance signal SL and compares the determined target value with the light intensity detection signal SFB. The light source control unit 201 supplies a current from the light source driver 300 to the light source group 11 when the light intensity detection signal SFB becomes less than the target value, and stops the supply of the current from the light source driver 300 to the light source group 11 when the light intensity detection signal SFB becomes equal to or higher than the target value. As a result, the light source control unit 201 feedback-controls the current value supplied from the light source driver 300 to the light source group 11 with the target value as the target while monitoring the light intensity detection signal SFB. This target value is set to different values for each light source 11r, 11g, and 11b.

As illustrated in FIG. 5, the light source control unit 201 includes a gain setting unit 201a that sets the gain of the light intensity detection signal SFB detected by the light intensity detection unit 500. The gain setting unit 201a sets the gain higher as the required luminance (required luminance signal SL) becomes lower. The gain setting unit 201a adjusts the gain of the light intensity detection signal SFB to set the light intensity detection signal SFB to a value readable by the light source control unit 201. The light source control unit 201 reads the light intensity detection signal SFB in consideration of the presence/absence and the amount of deviation of the gain set by the gain setting unit 201a. Accordingly, the deviation of the luminance of the illumination light C from the target value due to the variation in the gain caused by the individual difference of the light source control unit 201 is suppressed.

Figure 18:
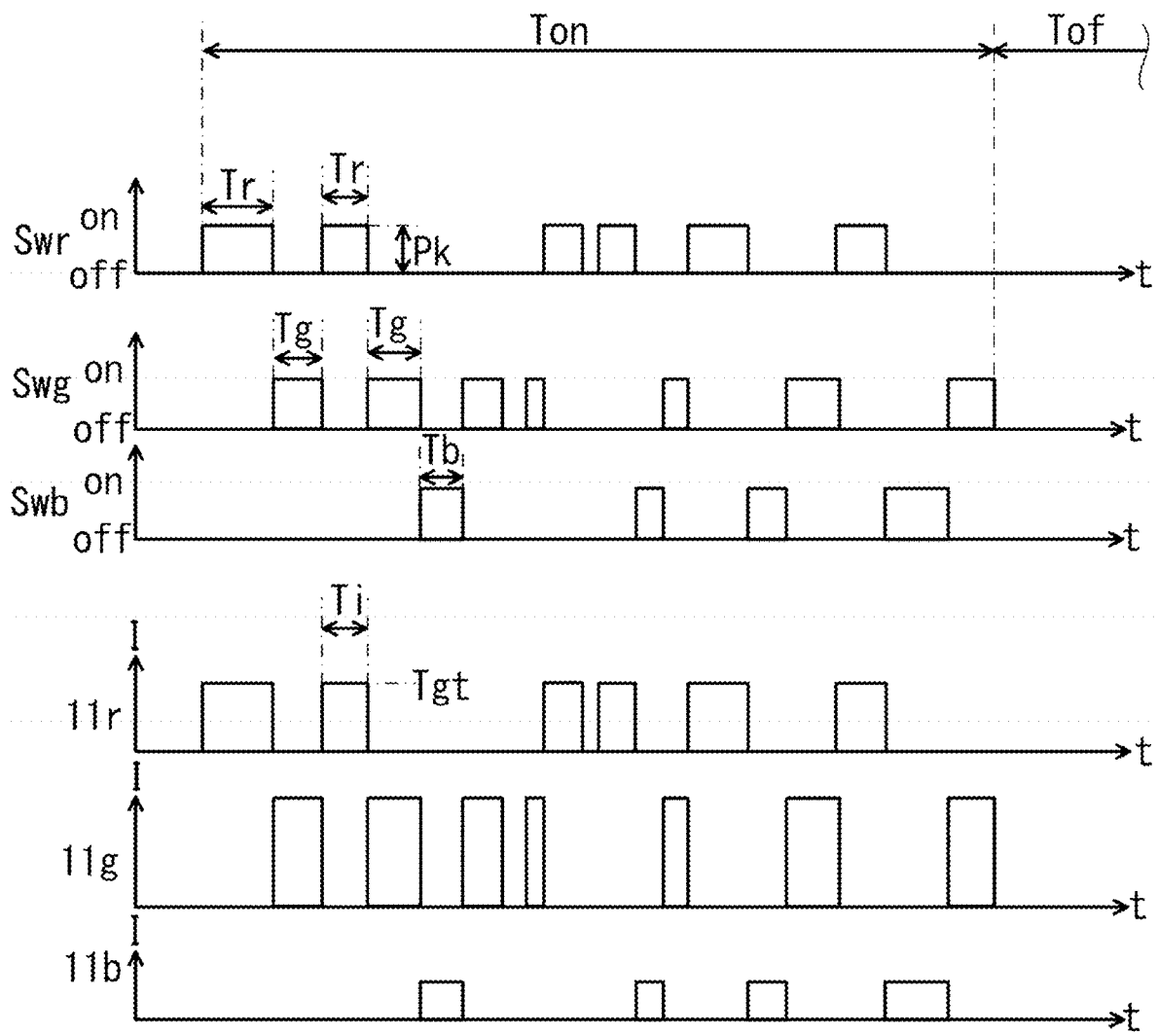
FIG. 18 is a timing chart illustrating a waveform pattern of a current supplied to a light source and an operation of a switch in the high-luminance mode according to the embodiment of the present disclosure.

As illustrated in FIG. 18, the light source control unit 201 turns ON the switch section Swr for a lighting-up permission period Tr, and thus a current Ir is supplied from the light source driver 300 to the light source 11r to light up the light source 11r.

The light source control unit 201 turns ON the switch section Swg for a lighting-up permission period Tg, and thus a current Ig is supplied from light source driver 300 to the light source 11g to light up the light source 11g. The light source control unit 201 turns ON the switch section Swb for a lighting-up permission period Tb, and thus a current Ib is supplied from the light source driver 300 to the light source 11b to light up the light source 11b.

The light source control unit 201 operates by a so-called field sequential method in which any one of the light sources 11r, 11g, and 11b is selectively lighted up and the light sources 11r, 11g, and 11b to be lighted up are switched. The light source control unit 201 supplies the currents Ir, Ig, and Ib to the light sources 11r, 11g, and 11b during a display period Ton, and turns OFF the switch sections Swr, Swg, and Swb during a non-display period Tof to thereby stop the supply of the currents Ir, Ig and Ib to the light sources 11r, 11g, and 11b. During the period when the image M is displayed, the display period Ton and the non-display period Tof are repeated alternately. The one display period Ton and the one non-display period Tof constitute one frame, that is, one cycle. The display period Ton includes a plurality of lighting-up permission periods Tr, Tg, and Tb in a preset order.

The second control unit 200 shifts to one of the high-luminance mode and low-luminance mode on the basis of the required luminance signal SL. The second control unit 200 shifts to the low-luminance mode when the required luminance signal SL is less than or equal to the threshold value, and shifts to the high-luminance mode when the required luminance signal SL exceeds the threshold value. For example, the threshold value is set to 4000 candela, for example.

In the high-luminance mode, as illustrated in FIG. 18, the second control unit 200 supplies the currents Ir, Ig, and Ib as rectangular waves to the light sources 11r, 11g, and 11b. In the high-luminance mode, the second control unit 200 changes a target value Tgt of the currents Ir, Ig, and Ib and a period Ti during which the currents Ir, Ig, and Ib are supplied, and a DMD duty ratio described below, in response to a change in a required luminance, thereby adjusting the luminance of the illumination light C or the display light L.

Figure 19:
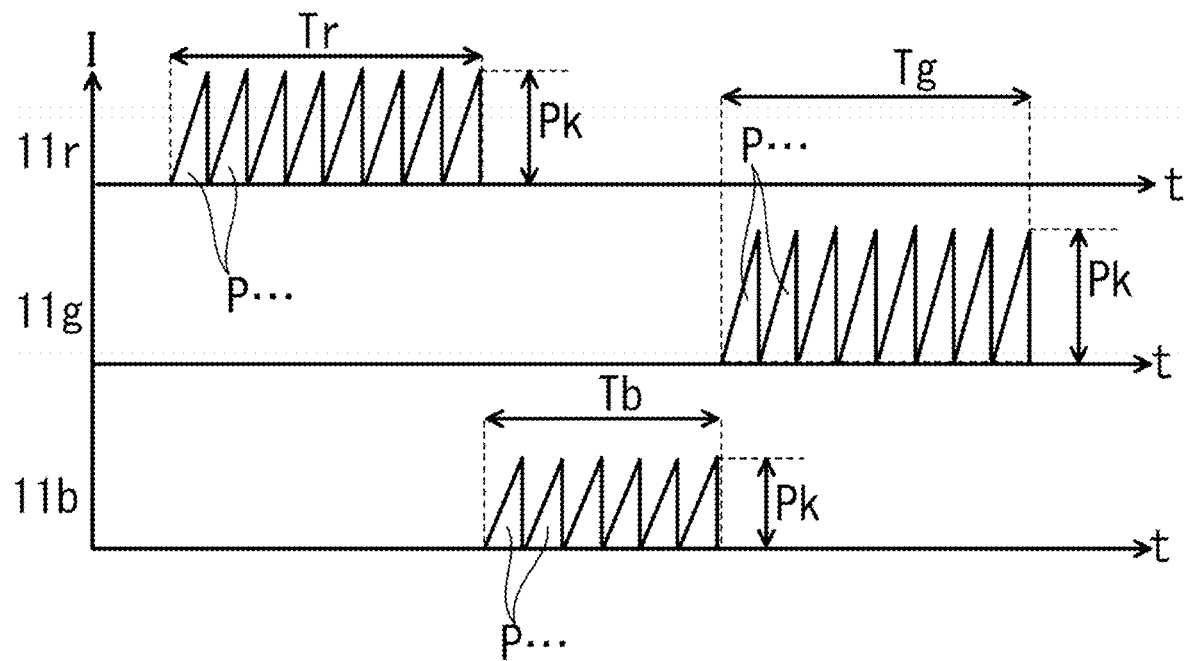
FIG. 19 is a timing chart illustrating a pulse of a current supplied to a light source in the low-luminance mode according to the embodiment of the present disclosure.

In the low-luminance mode, the second control unit 200 supplies the currents Ir, Ig, and Ib to the light sources 11r, 11g, and 11b as a plurality of pulses P that are triangular waves, as illustrated in FIG. 19. In the low-luminance mode, the second control unit 200 increases or decreases the number of pulses P in response to a change in the required luminance, thereby adjusting the luminance of the illumination light C or the luminance of the display light L. Not limited to this example, the second control unit 200 increases or decreases the number of pulses P and may also increase or decrease the peak value Pk (target value) of the pulse P to thereby adjust the luminance of the illumination light C or the display light L.

The method of generating the pulse P in the low-luminance mode will be described.

As illustrated in FIGS. 5 and 19, before generating the pulse P in the lighting-up permission period Tr, the second control unit 200 (light source control unit 201) turns the switch sections Swr and Swc to the ON state and turns the switch section Swg, Swb, and Swa to the OFF state. In doing so, the current flows from the light source driver 300 to the ground via the capacitor C1 and the switch section Swc. This charges the capacitor C1 with energy. When the capacitor C1 approaches the fully charged state, the current value flowing through the capacitor C1 becomes smaller, and the current Ir supplied to the light source 11r via the switch section Swr increases. This forms the waveform of the rising portion of the pulse P. The capacitor C1 allows the slope of the rising portion of the pulse P to be adjusted. Then, the second control unit 200 turns the switch section Swa to the ON state when the current Ir reaches the target value Tgt. In doing so, the current from the light source driver 300 flows to the ground via the switch section Swa and the current Ir supplied to the light source 11r decreases. This forms the waveform of the falling portion of the pulse P.

Figure 6:
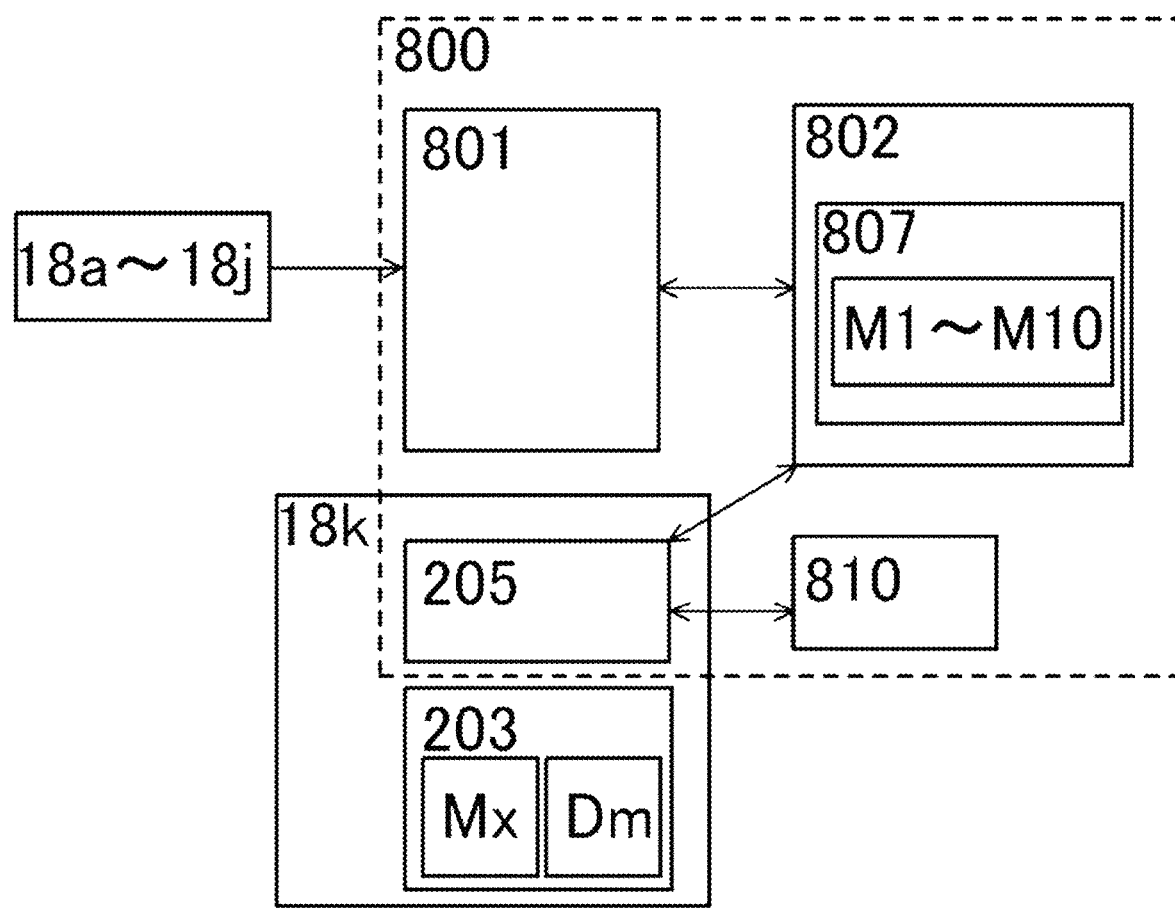
FIG. 6 is a block diagram of a lighting control data generation device according to the embodiment of the present disclosure.

As illustrated in FIG. 6, the lighting control data generation device 800 generates the lighting control data Dm suitable for the shipment product projector device 18k, which is a shipment product of the projector device 18. The lighting control data generation device 800 includes a sample product data acquisition device 801 that acquires RGB output characteristics at each temperature in the sample projector devices 18a to 18j which are sample products of the projector device 18, a master data generation unit 802 that generates master data M1 to M10 which are master lighting control data, on the basis of the RGB output characteristics acquired through the sample product data acquisition device 801, a shipment product data acquisition device 810 that acquires RGB output characteristics at each temperature in a shipment product projector device 18k, and a product data generation unit 205 that selects optimum master data Mx suitable for the shipment product projector device 18k from the master data M1 to M10, and corrects the optimum master data Mx on the basis of the RGB output characteristics acquired through the shipment product data acquisition device 810 to generate lighting control data Dm. The product data generation unit 205 constitutes a part of the shipment product projector device 18k. The sample product data acquisition device 801, the master data generation unit 802, and the shipment product data acquisition device 810 are provided separately from the projector device 18.

Figure 7:
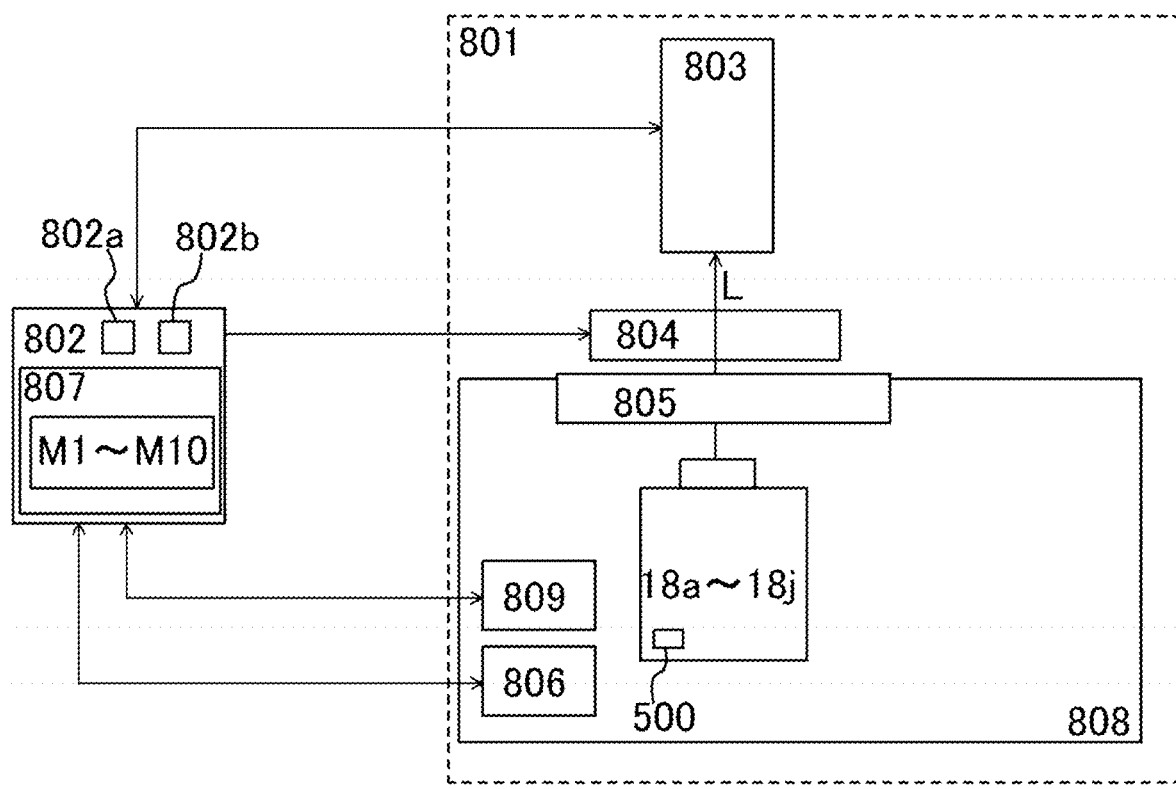
FIG. 7 is a block diagram of a sample product data acquisition device according to the embodiment of the present disclosure.

As illustrated in FIG. 7, the sample product data acquisition device 801 includes a lightmeter 803, a variable ND (Neutral Density) filter device 804, a room temperature adjustment unit 806, a thermostatic chamber 808, and an inspection light emission unit 809.

The thermostatic chamber 808 is a container that maintains a constant temperature in the internal space. The room temperature adjustment unit 806 adjusts the temperature of the internal space of the thermostatic chamber 808 under the control of the master data generation unit 802. Any of the sample projector devices 18a to 18j is sequentially housed in the thermostatic chamber 808. The thermostatic chamber 808 includes a thermostatic chamber glass 805 that transmits the display light L from the projector device 18. The thermostatic chamber glass 805 reduces the light intensity of the display light L as it passes therethrough. Inside the thermostatic chamber 808 is a dark room.

The lightmeter 803 and the variable ND filter device 804 are located in a dark room outside the thermostatic chamber 808.

The lightmeter 803 measures the luminance of the display light L that has passed through the variable ND filter device 804 and outputs the measured detection signal to the master data generation unit 802. The inspection light emission unit 809 irradiates the light intensity detection unit 500 with inspection light for inspecting the presence/absence and the amount of deviation of the gain set by the gain setting unit 201a.

The variable ND filter device 804 adjusts the luminance of the display light L that has passed the thermostatic chamber glass 805 within the measurable range of the lightmeter 803 under the control of the master data generation unit 802.

Figure 20:
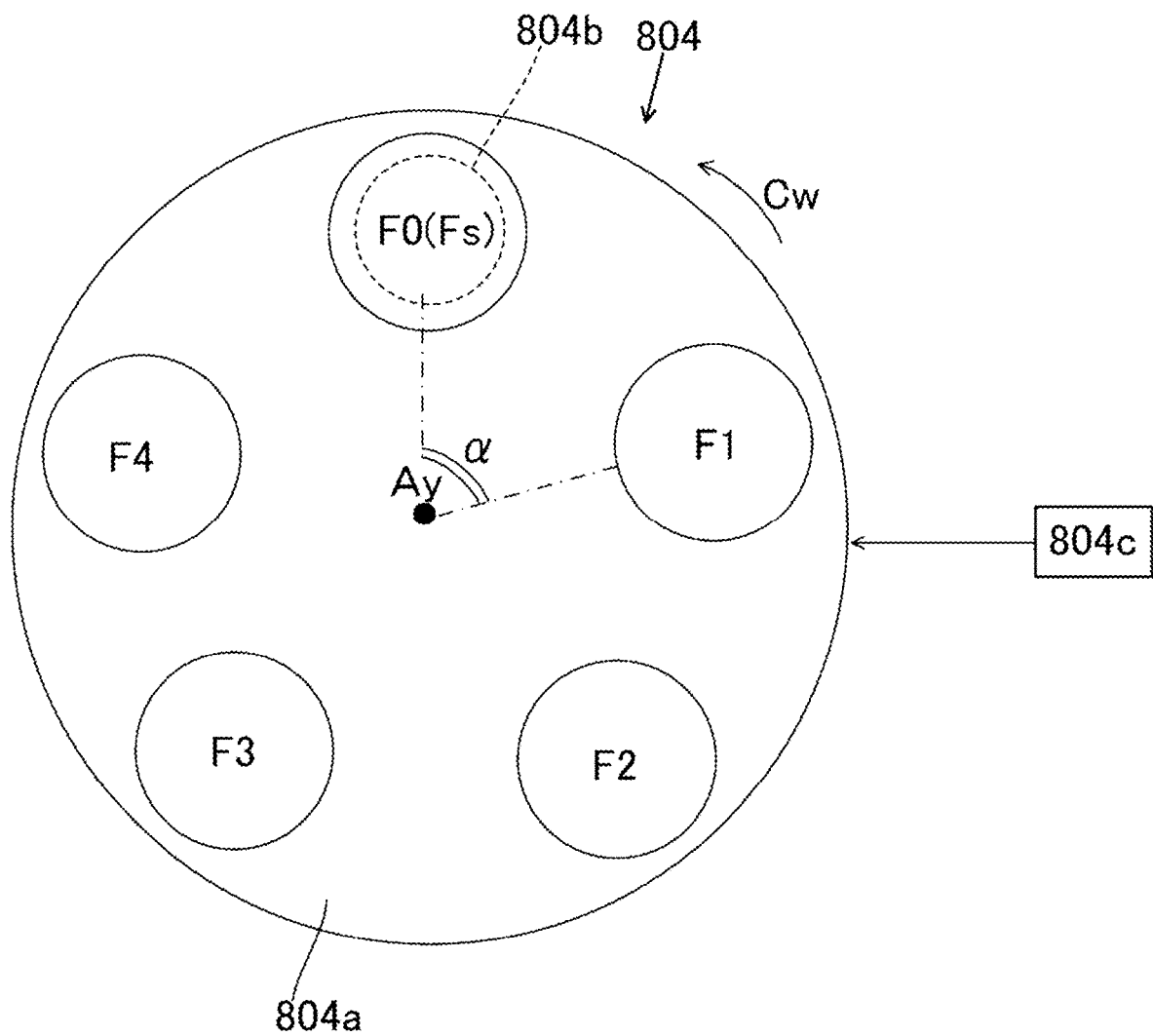
FIG. 20 is a pattern diagram of a variable ND filter device according to the embodiment of the present disclosure.

In detail, as illustrated in FIG. 20, the variable ND filter device 804 includes a plurality of, in this example, five filters F0 to F4 each set to a different light attenuation rate, a rotary plate 804a that supports the filters F0 to F4, and a rotation drive unit 804c that rotates the rotary plate 804a in a rotation direction Cw.

The magnitude relation between the light attenuation rates of the filters F0 to F4 is set to the light attenuation rate of the filter F0> the light attenuation rate of the filter F1> the light attenuation rate of the filter F2> the light attenuation rate of the filter F3> the light attenuation rate of the filter F4.

The rotary plate 804a is formed in the shape of a disc and is rotatably supported in the rotation direction Cw about a rotation axis Ay. The rotation direction Cw is a counterclockwise direction. The rotary plate 804a can rotate only in one direction of the rotation direction Cw, and is configured to be non-rotatable in the clockwise direction opposite to the rotation direction Cw. The rotation axis Ay is located at the center of the rotary plate 804a and extends along the thickness direction of the rotary plate 804a (the direction perpendicular to the plane of FIG. 20). The rotary plate 804a supports the filters F0 to F4 arranged along the rotation direction Cw. The filters F0 to F4 are spaced at equal angular intervals about the rotation axis Ay, at 72° intervals in this example.

In the above description, the configuration in which the rotary plate 804a can rotate only in the counterclockwise direction is illustrated, but the configuration is not limited to this, and the rotary plate 804*a* may be configured to rotate only in the clockwise direction.

The rotation drive unit 804*c* rotates the rotary plate 804*a* in the rotation direction Cw under the control of the master data generation unit 802, and thereby superimposes an irradiation range 804*b* on which the display light L is irradiated from the sample projector devices 18*a* to 18*j*, on any one of the filters F0 to F4. The irradiation range 804*b* is fixed to the rotating rotary plate 804*a*. The specific method of switching the filters F0 to F4 when acquiring RGB output characteristics will be described in detail below.

As illustrated in FIG. 7, the master data generation unit 802 includes, for example, a microcontroller. The master data generation unit 802 executes master data generation processing described below. The master data generation unit 802 includes a storage unit 807 that stores the master data M1 to M10, a measurement point specification unit 802*a*, and an output characteristic acquisition unit 802*b*. The processing content executed by the measurement point specification unit 802*a* and the output characteristic acquisition unit 802*b* will be described in detail below.

Figure 8:
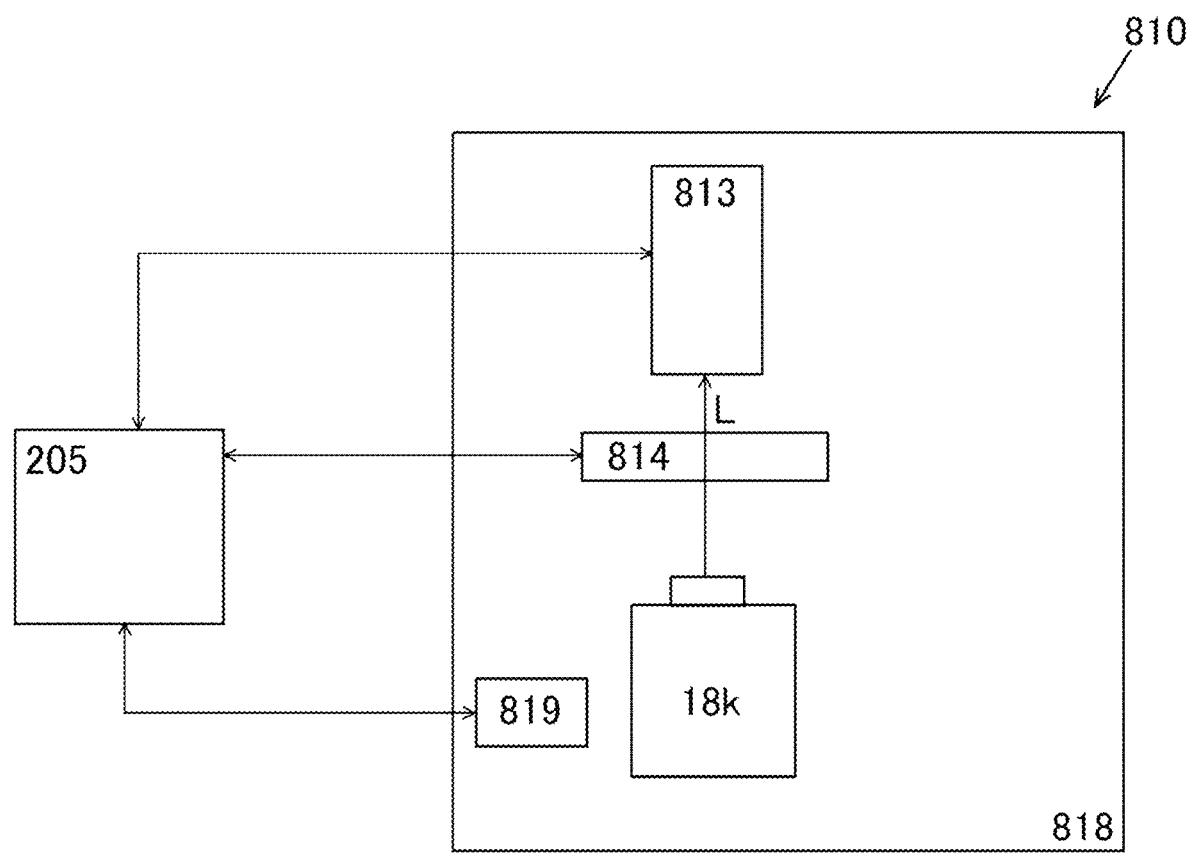
FIG. 8 is a block diagram of a shipment product data acquisition device according to an embodiment of the present disclosure.

As illustrated in FIG. 8, the shipment product data acquisition device 810 includes a lightmeter 813, a variable ND filter device 814, a chamber 818, and an inspection light emission unit 819.

The chamber 818 is located on the line where the shipment product projector device 18*k* is installed and houses the lightmeter 813 and the shipment product projector device 18*k*. Inside the chamber 818 is a dark room.

The variable ND filter device 814, similarly to the variable ND filter device 804, includes a plurality of filters, a rotary plate that supports the plurality of filters, and a rotation drive unit that rotates the rotary plate in the rotational direction. The variable ND filter device 814 is controlled by the product data generation unit 205. The lightmeter 813 has the same configuration as that of the lightmeter 803, and outputs a detection signal to the product data generation unit 205. The inspection light emission unit 819 has the same configuration as that of the inspection light emission unit 809, is controlled by the product data generation unit 205, and emits the inspection light to the light intensity detection unit of the shipment product projector device 18*k*.

(Master Data Generation Processing)

Figure 15:
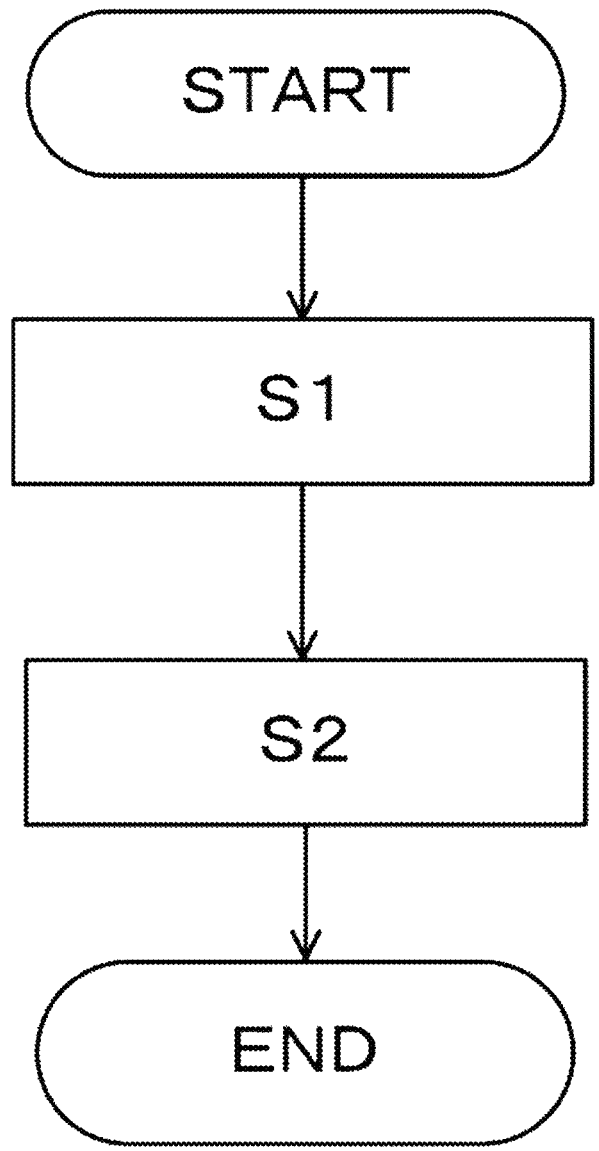
FIG. 15 is a flowchart of master data generation processing according to the embodiment of the present disclosure.

Referring to the flowchart in FIG. 15, the master data generation processing executed by the master data generation unit 802 is described.

Figure 9:
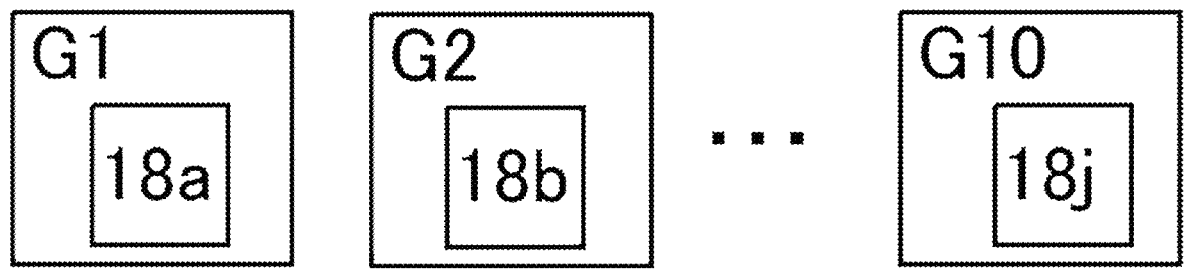
FIG. 9 is a schematic diagram illustrating a grade to which a sample projector device according to the embodiment of the present disclosure belongs.

First, as illustrated in FIG. 9, the master data generation unit 802 classifies the sample projector devices 18*a* to 18*j* into grades G1 to G10 in accordance with the drive capability of the light source driver 300 (step S1). The sample projector devices 18*a* to 18*j* are of the same variety and have different serial numbers. Therefore, each of the sample projector devices 18*a* to 18*j* has an individual difference. The drive capability of the light source driver 300, which is a kind of individual difference, is determined by the relation between the output level of the light source control unit 201 and the peak value Pk (see FIGS. 18 and 19) of the light source current flowing through the light sources 11*r*, 11*g*, and 11*b*. The higher the drive capability of the light source driver 300, the larger the peak value Pk of the light source current flowing through the light sources 11*r*, 11*g*, and 11*b*, even if the output level of the light source control unit 201 is low. The drive capability varies depending on the individual difference of the light source driver 300. For example, when the drive capability of the light source control unit 201 of the sample projector device 18*b* is higher than the drive capability of the light source control unit 201 of the sample projector device 18*a*, even if the output levels of the sample projector devices 18*a* and 18*b* are the same, the peak value Pk of the light source current in the sample projector device 18*b* is higher than the peak value Pk of the light source current in the sample projector device 18*a*, whereby the luminance of the illumination light C or the display light L is also increased.

As an example, in step S1, the master data generation unit 802 calculates the drive capability value obtained by dividing the peak value Pk of the light source current by the set output level for each of the sample projector devices 18*a* to 18*j*. That is, the drive capability value is calculated by the following formula.

Drive capability value=Peak value *Pk*/Output level

Then, after sorting the calculated drive capability values in order of high to low, the master data generation unit 802 classifies the sample projector devices 18*a* to 18*j* into grades G1 to G10 in order of high to low drive capability values. For example, if the drive capability value of the sample projector device 18*a* is the lowest among the sample projector devices 18*a* to 18*j*, then the sample projector device 18*a* is classified as grade G1. If the drive capability value of the sample projector device 18*b* is the second lowest among the sample projector devices 18*a* to 18*j*, then the sample projector device 18*b* is classified as grade G2. The following projector devices 18*c* to 18*j* are similarly classified in the same way, respectively, as grades G3 to G10.

Next, the master data generation unit 802 generates the master data M1 to M10 for each grade G1 to G10, stores the generated master data M1 to M10 in the storage unit 807 (step S2), and ends the master data generation processing. The master data generation processing is executed prior to the manufacture of the shipment product projector device 18*k*.

Figure 16:
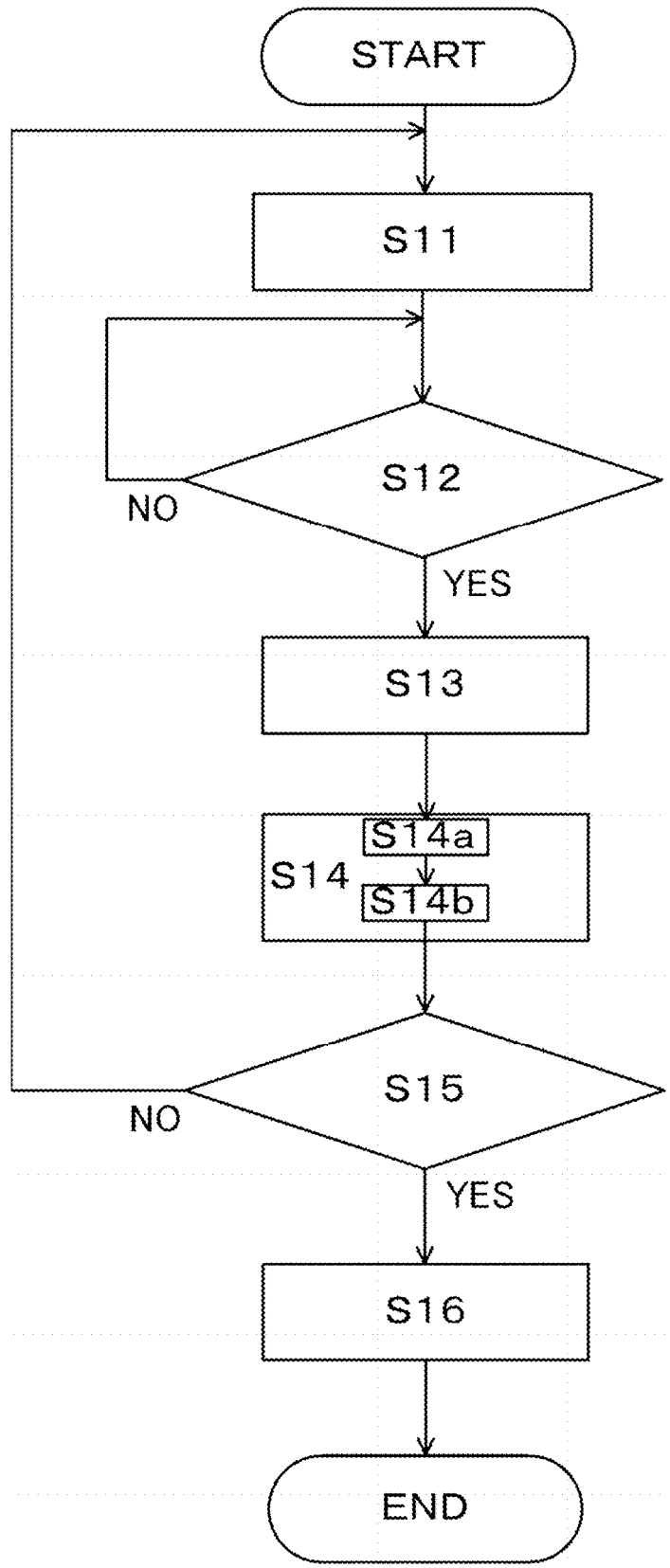
FIG. 16 is a sub-flowchart of master data generation processing according to the embodiment of the present disclosure.

In this step S2, the master data generation unit 802 reads out the sub-flowchart illustrated in FIG. 16 for generating the master data M1 to M10.

The processing according to the sub-flowchart in FIG. 16 is performed for each sample projector device 18*a* to 18*j*. As a result, the master data M1 to M10 corresponding to the grades G1 to G10 are generated. Each master data M1 to M10 has master data at each temperature. The following example describes the case of generating master data M1 for grade G1. In this case, before the start of the sub-flowchart in FIG. 16, the sample projector device 18*a*, having the grade G1, is installed in the thermostatic chamber 808 illustrated in FIG. 7, and the sample projector device 18*a* is turned ON.

First, the master data generation unit 802 sets the temperature inside the thermostatic chamber 808 to a target temperature via the room temperature adjustment unit 806 (step S11). Then, the master data generation unit 802 waits for the temperature in the thermostatic chamber 808 to stabilize at the target temperature (step S12; NO). Then, when determining that the temperature in the thermostatic chamber 808 is stable at the target temperature (step S12; YES), the master data generation unit 802 acquires gain deviation information which is the IC characteristic of the light source control unit 201 (step S13). In this step S13, the master data generation unit 802 irradiates the light intensity detection unit 500 with the inspection light through the inspection light emission unit 809. The inspection light is light of a preset luminance. Then, the master data generation unit 802 measures the light intensity detection signal SFB when the light intensity detection unit 500 is irradiated with the inspection light, in a state where the gain is set to the setting value by the gain setting unit 201a. Then, the master data generation unit 802 acquires gain deviation information indicating a deviation from the setting value of the gain on the basis of the difference between the measured light intensity detection signal SFB and a reference value. This reference value is, for example, the average value of the light intensity detection signal SFB when the light intensity detection unit 500 is irradiated with the inspection light in a state where the gain is set to the setting value by the gain setting unit 201a in a plurality of projector devices 18.

Next, the master data generation unit 802 acquires the RGB output characteristics of each of the control modes Q1 to Qn at the target temperature adjusted by the room temperature adjustment unit 806 in consideration of the acquired gain deviation information, thereby generating the master data M1 (step S14).

Figure 10:
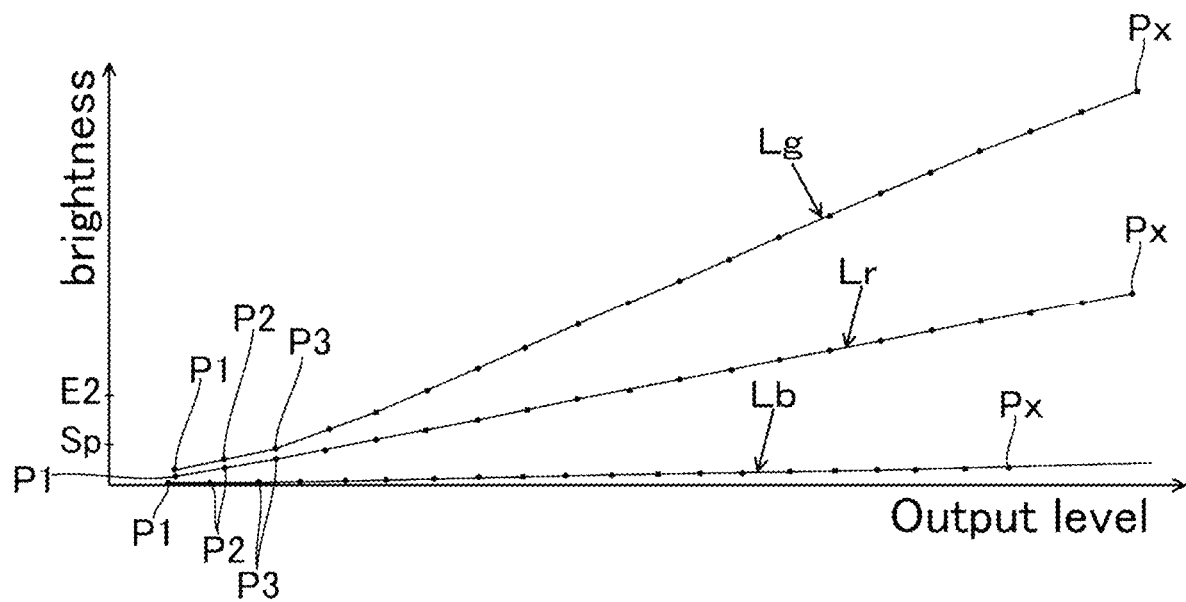
FIG. 10 is a graph illustrating RGB output characteristics during master data generation according to the embodiment of the present disclosure.

As illustrated in FIG. 10, the RGB output characteristics are characteristics indicating the relation between the output level of the light source control unit 201 and the luminance of the display light L detected by the lightmeter 803. The RGB output characteristics include an R output characteristic related to the light source 11r for emitting a desired color, for example, a white illumination light C, a G output characteristic related to the light source 11g, and a B output characteristic related to the light source 11b.

This step S14 includes a measurement point specification step S14a executed by the measurement point specification unit 802a that specifies a plurality of measurement points P1 to Px in accordance with each of a different plurality of output levels of the light source control unit 201 and the luminance of the light emitted by the light sources 11r, 11g, and 11b, and an output characteristic acquisition step S14b executed by the output characteristic acquisition unit 802b that acquires RGB output characteristics by interpolating between the plurality of the specified measurement points P1 to Px.

The x of the measurement point Px illustrated in FIG. 10 is a given number. In the master data, x is set to the same number for both low-luminance mode and high-luminance mode, e.g., 20. The master data must be highly reliable. Therefore, the number of measurement points of the master data is set to be larger than the number of measurement points when acquiring the RGB output characteristics in the shipment product projector device 18k described below. In detail, the measurement point specification unit 802a sequentially measures red light from the light source 11r, green light from the light source 11g, and blue light from the light source 11b. For example, in measuring red light, the measurement point specification unit 802a sets the output level of the light source control unit 201 to a first value, and then supplies the currents Ir, Ig, and Ib to the light sources 11r, 11g, and 11b in order, thereby lighting up the light sources 11r, 11g, and 11b, as illustrated in FIG. 18. When measuring red light, the measurement point specification unit 802a turns each micromirror 30a of the DMD display element 30 to the ON state during the period when the light source 11r which is the light source to be measured is lit, and turns each micromirror 30a of the DMD display element 30 to the OFF state during the period when the light sources 11g and 11b other than the light source 11r are lit. Then, the measurement point specification unit 802a measures the luminance of the red light which is the display light L, through the lightmeter 803, and plots the luminance at a measurement point P1 where the first value and the luminance of the red light intersect.

Next, the measurement point specification unit 802a sets the output level of the light source control unit 201 to a second value larger than the first value, and then, in the same manner as described above, measures the luminance of the red light which is the display light L, through the lightmeter 803, and plots the luminance at a measurement point P2 where the second value and the luminance of the red light intersect. Subsequently, measurement points P3 to Px are plotted in the same manner.

The measurement points P1 to Px illustrated in FIG. 10 are set at equal intervals on the horizontal axis corresponding to the output level of the light source control unit 201.

The measurement point specification unit 802a measures the luminance of the red light of the light source 11r for a preset measurement count (e.g., 10 times) at the output level of the light source control unit 201 in either the low-luminance mode or the high-luminance mode, and specifies the measurement points P1 to Px by averaging the measured luminance for the measurement count. The master data must be highly reliable. Therefore, the number of times to average the luminance when generating the master data is set to be larger than the number of times to average the luminance when generating the lighting control data Dm of the shipment product projector device 18k described below.

The output characteristic acquisition unit 802b acquires the R output characteristic related to the light source 11r indicated by a polygonal line Lr in FIG. 10 by interpolating between the specified plurality of measurement points P1 to Px, for example, by performing linear interpolation.

Similarly to the R output characteristic, the master data generation unit 802 acquires the G output characteristics related to the light source 11g indicated by a polygonal line Lg in FIG. 10 and the B output characteristic related to the light source 11b indicated by a polygonal line Lb in FIG. 10. When specifying the measurement point of the G output characteristic, the master data generation unit 802 turns each micromirror 30a of the DMD display element 30 to the ON state during the period when the light source 11g which is the light source to be measured is lit, and turns each micromirror 30a of the DMD display element 30 to the OFF state during the period when the light sources 11r and 11b other than the light source 11g are lit. Further, when specifying the measurement point of the B output characteristic, the master data generation unit 802 turns each micromirror 30a of the DMD display element 30 to the ON state during the period when the light source 11b which is the light source to be measured is lit, and turns each micromirror 30a of the DMD display element 30 to the OFF state during the period when the light sources 11r and 11g other than the light source 11b are lit.

The RGB output characteristics are thus acquired. The master data generation unit 802 acquires RGB output characteristics for each of the control modes Q1 to Qn.

For example, in a case where the gain is deviated exceeding the setting value, if a correction that takes into account the gain deviation information is not performed, the current value of the light intensity detection signal SFB with respect to the light intensity of the light irradiated to the light intensity detection unit 500 will be higher, and thus the luminance of the display light L adjusted on the basis of the light intensity detection signal SFB is also increased. In this way, in order to suppress the increase in the luminance of the display light L as the gain exceeds the setting value, a correction that takes into account the gain deviation information is performed. For example, if the gain deviation information includes information that the gain is deviated exceeding the setting value, the master data generation unit 802 takes into account the acquired gain deviation information to thereby correct in such a manner that the measurement points P1 to Px and thus the polygonal lines Lr, Lg, and Lb are shifted downward, that is, in the direction of decreasing luminance. In the same way, for example, if the gain deviation information includes information that the gain is deviated falling below the setting value, the master data generation unit 802 takes into account the acquired gain deviation information to thereby correct in such a manner that the measurement points P1 to Px and thus the polygonal lines Lr, Lg, and Lb are shifted upward, that is, in the direction of increasing luminance. The correction amount at this time is a value corresponding to the amount of deviation between the gain included in the gain deviation information and the setting value.

When detecting the luminance of the light from the light sources 11r, 11g, and 11b through the lightmeter 803 in the measurement point specification step S14a, the measurement point specification unit 802a superimposes any of the filters F0 to F4 on the irradiation range 804b through the variable ND filter device 804 to thereby set any of the filters F0 to F4 to the selected filter Fs, as indicated in Table 1 below.

TABLE 1

|  | Light | | |
| --- | --- | --- | --- |
| Mode | R | G | B |
| Q1 | F0 | F0 | F0 |
| Q2 | F1 | F1 | F1 |
| . | . | . | . |
| . | . | . | . |
| . | . | . | . |
| Qa | F1 | F1 | F1 |
| . | . | . | . |
| . | . | . | . |
| . | . | . | . |
| Qb | F2 | F2 | F2 |
| . | . | . | . |
| . | . | . | . |
| . | . | . | . |
| Qc | F2 | F2 | F2 |
| . | . | . | . |
| . | . | . | . |
| . | . | . | . |
| Qd | F3 | F3 | F3 |
| . | . | . | . |
| . | . | . | . |
| . | . | . | . |
| Qn − 1 | F3 | F3 | F3 |
| Qn | F4 | F4 | F4 |

As indicated in Table 1 above, the variable ND filter device 804 acquires RGB output characteristics in descending order of the median value of the luminance range Bl from the control mode Q1 to the control mode Qn under the control of the master data generation unit 802. In doing so, the variable ND filter device 804 switches the selected filter Fs in order of filter F0, filter F1, filter F2, filter F3, and filter F4, in other words, switches the filters F0 to F4 in descending order of the light attenuation rate.

In Table 1 above, a, b, c, and d of the control modes Qa, Qb, Qc, and Qd are given numbers, and are set to a magnitude relation of 2<a<b<c<d<n.

In detail, as illustrated in Table 1 above, the variable ND filter device 804 sets the filter F0 to the selected filter Fs when acquiring the R output characteristic, the G output characteristic, and the B output characteristic of the control mode Q1.

After acquiring the B output characteristic of the control mode Q1 and before starting acquisition of the R output characteristic of the control mode Q2, the variable ND filter device 804 switches the selected filter Fs from the filter F0 to the filter F1. In doing so, as illustrated in FIG. 20, the variable ND filter device 804 rotates the rotary plate 804a by a switching angle α along the rotation direction Cw via the rotation drive unit 804c. This switching angle α is set to an angle obtained by dividing 360° by the number of filters.

Then, as illustrated in Table 1 above, the variable ND filter device 804 maintains the selected filter Fs in the filter F1 from the control mode Q2 to the control mode Qa. Next, after acquiring the B output characteristic of the control mode Qa and before acquiring the R output characteristic of the control mode Qb, the variable ND filter device 804 switches the selected filter Fs from the filter F1 to the filter F2. In doing so, as illustrated in FIG. 20, the variable ND filter device 804 rotates the rotary plate 804a by a switching angle α along the rotation direction Cw via the rotation drive unit 804c.

Then, as illustrated in Table 1 above, the variable ND filter device 804 maintains the selected filter Fs in the filter F2 from the control mode Qb to the control mode Qc. Next, after acquiring the B output characteristic of the control mode Qc and before acquiring the R output characteristic of the control mode Qd, the variable ND filter device 804 switches the selected filter Fs from the filter F2 to the filter F3. In doing so, as illustrated in FIG. 20, the variable ND filter device 804 rotates the rotary plate 804a by a switching angle α along the rotation direction Cw via the rotation drive unit 804c.

Then, as illustrated in Table 1 above, the variable ND filter device 804 maintains the selected filter Fs in the filter F3 from the control mode Qd to the control mode Qn−1. Next, after acquiring the B output characteristic of the control mode Qn−1 and before acquiring the R output characteristic of the control mode Qn, the variable ND filter device 804 switches the selected filter Fs from the filter F3 to the filter F4. In doing so, the variable ND filter device 804 rotates the rotary plate 804a by a switching angle α along the rotation direction Cw via the rotation drive unit 804c.

The RGB output characteristics in the control modes Q1 to Qn are thus acquired. When RGB output characteristics are acquired in the control modes Q1 to Qn, the selected filter Fs is never switched in such a manner that the light attenuation rate is low. For example, if the selected filter Fs is switched from the filter F2 to the filter F1 for a lower light attenuation rate, it is necessary to rotate the rotary plate 804a along the rotation direction Cw for an angle larger than the switching angle α, for example, 288°. In this case, switching the selected filter Fs takes time. On the other hand, in this embodiment, when switching the selected filter Fs, it is only necessary to rotate the rotary plate 804a by the switching angle α. Therefore, the time required for switching the selected filter Fs is suppressed.

In this example, the variable ND filter device 804 sets the common selected filter Fs for each control mode Q1 to Qn, but the selected filter Fs is not limited to this. For example, after acquiring the R output characteristic of the control mode Qa and before acquiring the G output characteristic of the control mode Qa, the variable ND filter device 804 may switch the selected filter Fs from the filter F1 to the filter F2.

The master data generation unit 802 determines whether the master data M1 has been generated at each temperature (step S15). Each temperature is, for example, −40° C., −30° C., −10° C., 10° C., 25° C., 40° C., 50° C., 60° C., and 70° C. When determining that the master data M1 has not been generated at each temperature (step S15; NO), the master data generation unit 802 returns to the processing of step S11 and sets the target temperature to the temperature at which the master data M1 is not generated through the room temperature adjustment unit 806. In other words, by repeating steps S11 to S15, the master data M1 is generated at each temperature.

When determining that the master data M1 has been generated at each temperature (step S15; YES), the master data generation unit 802 stores the generated master data M1 at each temperature in the storage unit 807 (step S16), and the sub-flowchart in FIG. 16 is completed. The master data M1 contains the same content as the lighting control data Dm illustrated in FIG. 13 above. The master data M2 to M10, as well as the master data M1, are also generated by the sub-flowchart illustrated in FIG. 16.

(Product Data Generation Processing)

Figure 17:
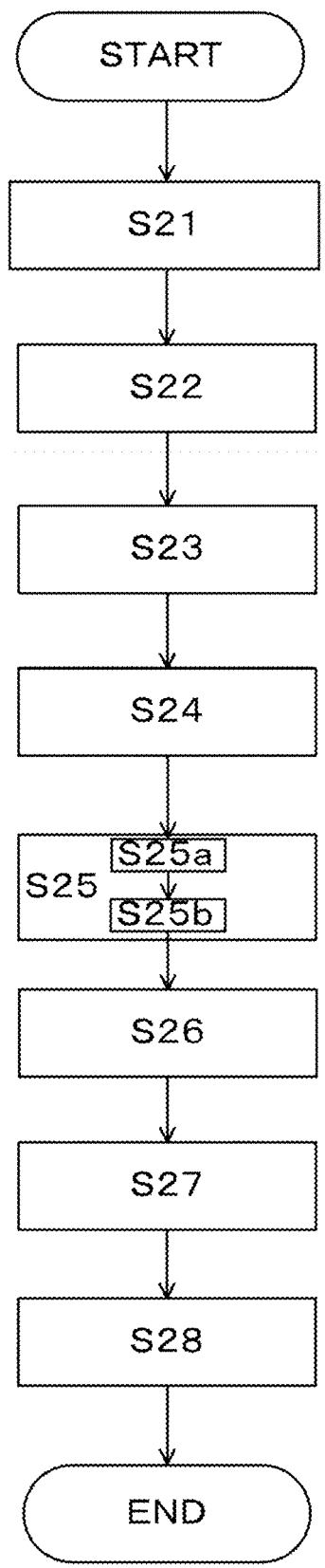
FIG. 17 is a flowchart of product data generation processing according to the embodiment of the present disclosure.

Next, the product data generation processing executed by the product data generation unit 205 will be described according to the flowchart in FIG. 17. First, the drive capability determination unit 205a determines the drive capability of the light source driver 300 of the shipment product projector device 18k (step S21). In this step S21, for example, the drive capability determination unit 205a, as described above, calculates the drive capability value of the light source driver 300 of the shipment product projector device 18k.

Then, the master data selection unit 205b selects the optimum master data Mx from master data M1 to M10 on the basis of the determined drive capability (step S22). In this step S22, the master data selection unit 205b selects, as the optimum master data Mx, the master data corresponding to a group to which a sample projector device that is closest to the calculated drive capability value among the drive capability values of the respective sample projector devices 18a to 18j.

Then, the product data generation unit 205 stores the selected optimum master data Mx in the storage unit 203 as provisional lighting control data Dm (step S23). In steps S24 to S26, the shipment product projector device 18k operates on the basis of the provisional lighting control data Dm.

Next, the output characteristic acquisition unit 205d acquires the gain deviation information of the shipment product projector device 18k through the shipment product data acquisition device 810 (step S24), and acquires the RGB output characteristics at room temperature in the shipment product projector device 18k (step S25). Steps S24 and S25 are the same processing as steps S13 and S14, respectively. Since the processing according to step S25 only acquires the RGB output characteristics at room temperature, the processing can be performed in a shorter time than the master data generation processing for acquiring the RGB output characteristics at each temperature.

Similarly to the step of acquiring the RGB output characteristics of the master data according to the above step S14, this step S25 includes a measurement point specification step S25a executed by the measurement point specification unit 205c that specifies a plurality of measurement points P1 to Pm, Pn in accordance with a luminance of light emitted by the light sources 11r, 11g, and 11b at each of a different plurality of output levels by a light source control unit 201, and an output characteristic acquisition step S25b executed by the output characteristic acquisition unit 205d that acquires RGB output characteristics by interpolating between a plurality of the specified measurement points P1 to Pm, Pn.

Hereinafter, step S25 of acquiring the RGB output characteristics of a shipment product will be described focusing on the differences from step S14 of acquiring the RGB output characteristics related to the master data. The scale of the vertical axis indicating luminance is different in the graphs in FIGS. 11 and 12, and a reference value Sp set on the vertical axis is set to the same value. The reference value Sp is, for example, 2000 Nit.

Figure 11:
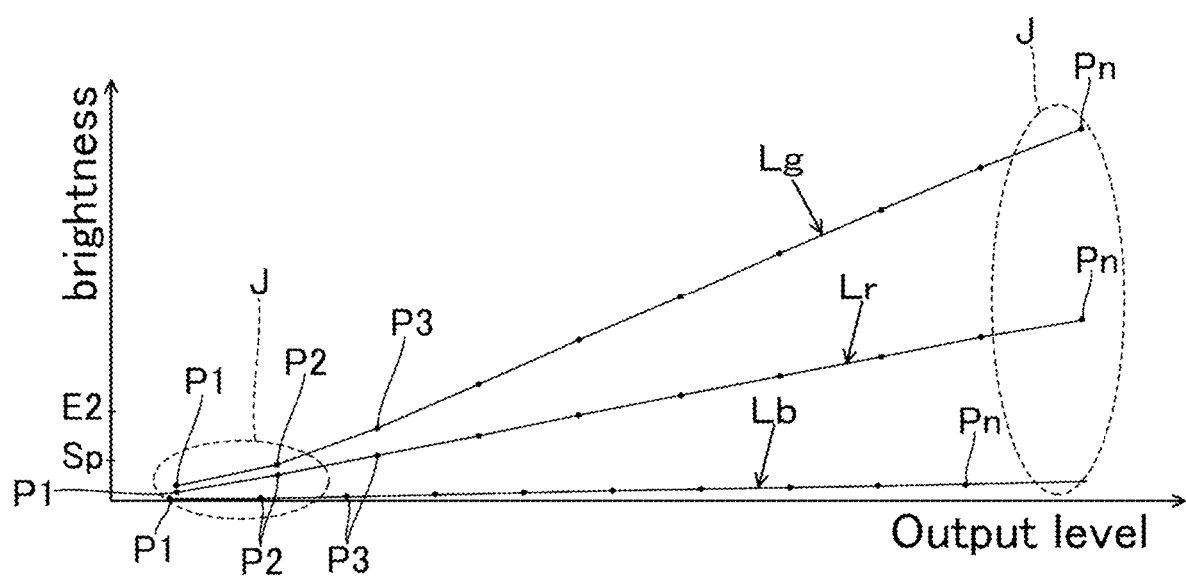
FIG. 11 is a graph illustrating RGB output characteristics in a high-luminance mode during product data generation according to the embodiment of the present disclosure.

In the high-luminance mode where the required luminance exceeds the threshold value, the measurement point specification unit 205c specifies a first specified number n of measurement points P1 to Pn, as illustrated in FIG. 11. In the high-luminance mode, the output characteristic acquisition step S25b acquires RGB output characteristics by linearly interpolating between the specified measurement points P1 to Pn.

Figure 12:
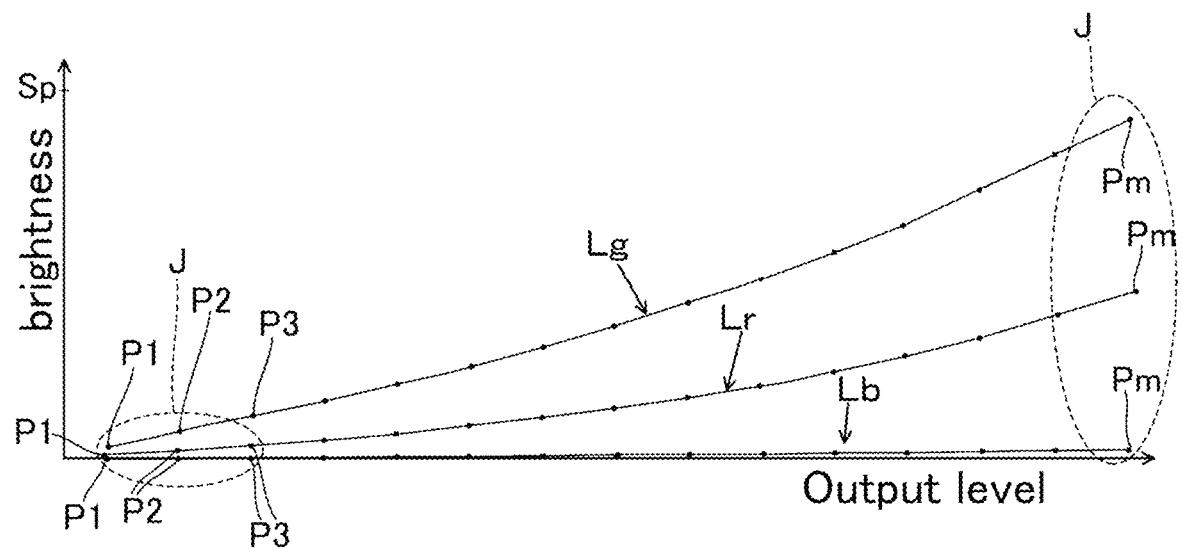
FIG. 12 is a graph illustrating RGB output characteristics in a low-luminance mode during product data generation according to the embodiment of the present disclosure.

In the low-luminance mode where the required luminance is less than or equal to the threshold value the threshold value, the measurement point specification unit 205c specifies a second specified number m of measurement points P1 to Pm, as illustrated in FIG. 12. In the low-luminance mode, the output characteristic acquisition step S25b acquires RGB output characteristics by linearly interpolating between the specified measurement points P1 to Pm. The output characteristic acquisition unit 205d may perform not only linear interpolation but also curve interpolation between the specified measurement points P1 to Pm in the low-luminance mode. The curve interpolation is, for example, Lagrangian interpolation, spline interpolation, or least-squares method. In the high-luminance mode, the relation between the luminance and the output level of the light source control unit 201 tends to change linearly, and in the low-luminance mode, the relation between the luminance and the output level of the light source control unit 201 tends to change curvilinearly. Taking this tendency into account, it is preferable to perform curve interpolation between the measurement points P1 to Pm in the low-luminance mode. The first specified number n and the second specified number m are each natural numbers, and the second specified number m is larger than the first specified number n, that is, m>n. In this way, the reliability of the RGB output characteristics of the low-luminance mode, which requires higher accuracy than the high-luminance mode, can be enhanced by setting the second specified number m of the low-luminance mode to be larger than the first specified number n of the high-luminance mode. In this example, the first specified number n is 10 and the second specified number m is 15.

The measurement points P1 to Pn and measurement points P1 to Pm are set at equal intervals on the horizontal axis corresponding to the output level of the light source control unit 201.

Similarly to the measurement point specification unit 802a, the measurement point specification unit 205c turns each micromirror 30a of the DMD display element 30 to the ON state during the period when any one of the light sources 11r, 11g, and 11b, which is the light source to be measured is lit, and turns each micromirror 30a of the DMD display element 30 to the OFF state during the period when the light sources 11r, 11g, and 11b other than the light source to be measured are lit. For example, when acquiring the RGB output characteristics in the control mode Q1, light sources other than the light source to be measured are lit with the luminance of the median value of the luminance range Bl1 of the control mode Q1.

In the low-luminance mode, the measurement point specification unit 205c measures the luminance of the light of the light source to be measured for a second measurement count N2 at the output level set by the light source control unit 201, and specifies the measurement points P1 to Pm by averaging the measured luminance for the measurement count. In the high-luminance mode, the measurement point specification unit 205c measures the luminance of the light of the light source to be measured for a first measurement count N1 at the output level set by the light source control unit 201, and specifies the measurement points P1 to Pn by averaging the measured luminance for the measurement count. In the low-luminance mode, the measurement points P1 to Pm with higher accuracy are required. Accordingly, the second measurement count N2 is set to a larger number than the first measurement count N1. As an example, the second measurement count N2 is set to 5 times and the first measurement count N1 is set to 3 times.

Then, the product data generation unit 205 obtains comparison data Mc illustrated in FIG. 13 on the basis of the acquired RGB output characteristics (step S26). The comparison data Mc is the data that is compared to the optimum master data Mx, and the luminance range Bl in each control mode Q1 to Qn differs from that of the optimum master data Mx.

Next, the data correction unit 205e corrects the optimum master data Mx on the basis of the difference between the comparison data Mc and the optimum master data Mx at room temperature (e.g., 25°) to thereby generate the lighting control data Dm (step S27).

Figure 14:
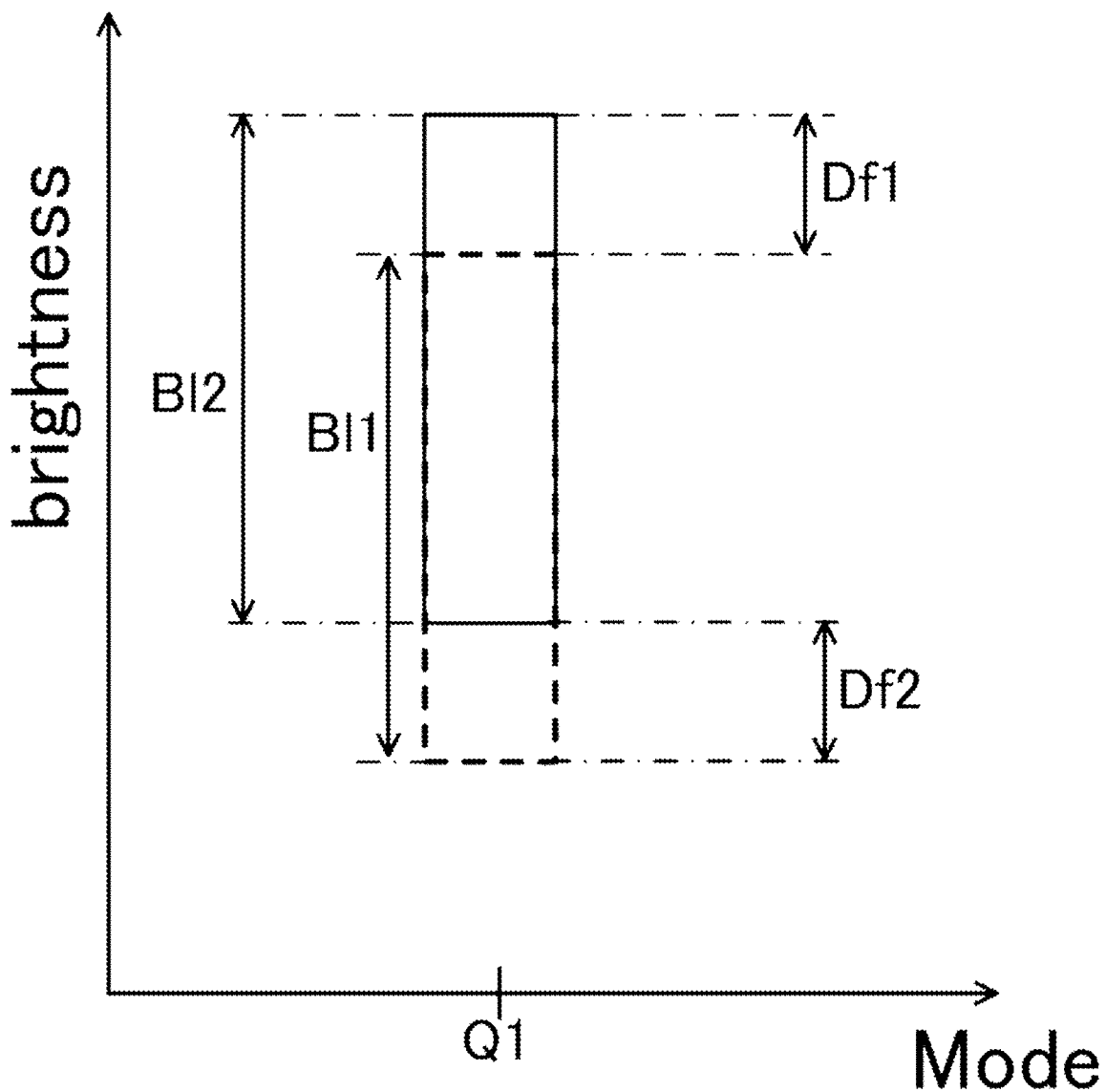
FIG. 14 is an enlarged view of a part of FIG. 13.

In this step S27, as illustrated in FIG. 14, the product data generation unit 205 acquires difference values Df1 and Df2 between the luminance range Bl1 of the optimum master data Mx at room temperature and the luminance range Bl2 of the comparison data Mc in the control mode Q1. The difference value Df1 is the difference value of the maximum value of the luminance ranges Bl1 and Bl2. The difference value Df2 is the difference value of the minimum value of the luminance ranges Bl1 and Bl2. Then, the product data generation unit 205 uses the difference values Df1 and Df2 as correction values to correct the luminance range Bl of the control mode Q1 of the optimum master data Mx for each temperature. For example, the product data generation unit 205 increases the upper limit value of the luminance range Bl1 of the optimum master data Mx by the difference value Df1 and increases the lower limit value of the luminance range Bl1 of the optimum master data Mx by the difference value Df2. Similarly, in the control modes Q2 to Qn, the luminance range Bl is corrected. That is, the correction values based on the comparison of the optimum master data Mx at room temperature and the comparison data Mc are also used to correct the optimum master data Mx at each temperature other than room temperature. Accordingly, the correction of the optimum master data Mx can be simplified.

The product data generation unit 205 writes the corrected optimum master data Mx in the storage unit 203 as the lighting control data Dm (step S28), and ends the product data generation processing. As a result, the shipment product projector device 18k can use the lighting control data Dm suitable for the shipment product projector device 18k, and thus the luminance and chromaticity of the display light L can be brought close to the target value.

Next, the operation of the projector device 18 which is the shipment product projector device 18k in which the lighting control data Dm is written as described above will be described.

As illustrated in FIG. 13, the second control unit 200 of the projector device 18 switches between the control modes Q1 to Qn in accordance with a required luminance. The end portion of the luminance range Bl of the control modes Q1 to Qn is set to an unused range J. The second control unit 200 switches the mode between the control modes Q1 and Qn before the required luminance reaches the unused range J. The unused range J is the range of luminance range Bl of the control modes Q1 to Qn, that is not used by the projector device 18. The end portion of the luminance range Bl has a lower accuracy of achieving a desired color, for example, white illumination light C or display light L, as compared with the central portion other than the end portion of the luminance range Bl. Accordingly, by setting the end portion of the luminance range Bl of the control modes Q1 to Qn to the unused range J, the accuracy with which a desired color, for example, white illumination light C or display light L can be achieved is increased.

Next, the method of setting the unused range J will be described. The unused range J may be automatically set by a program executed by the second control unit 200, or may be set by an operation of a computer or the like by a person. Hereinafter, referring to FIG. 21, an unused range J1 located at the lower end portion of a luminance range BlA of the control mode Q1 and an unused range J2 located at the lower end portion of a luminance range BlB of the control mode Q2 will be described. An unused range J of the other control modes Q3 to Qn is also set in the same manner.

Figure 21:
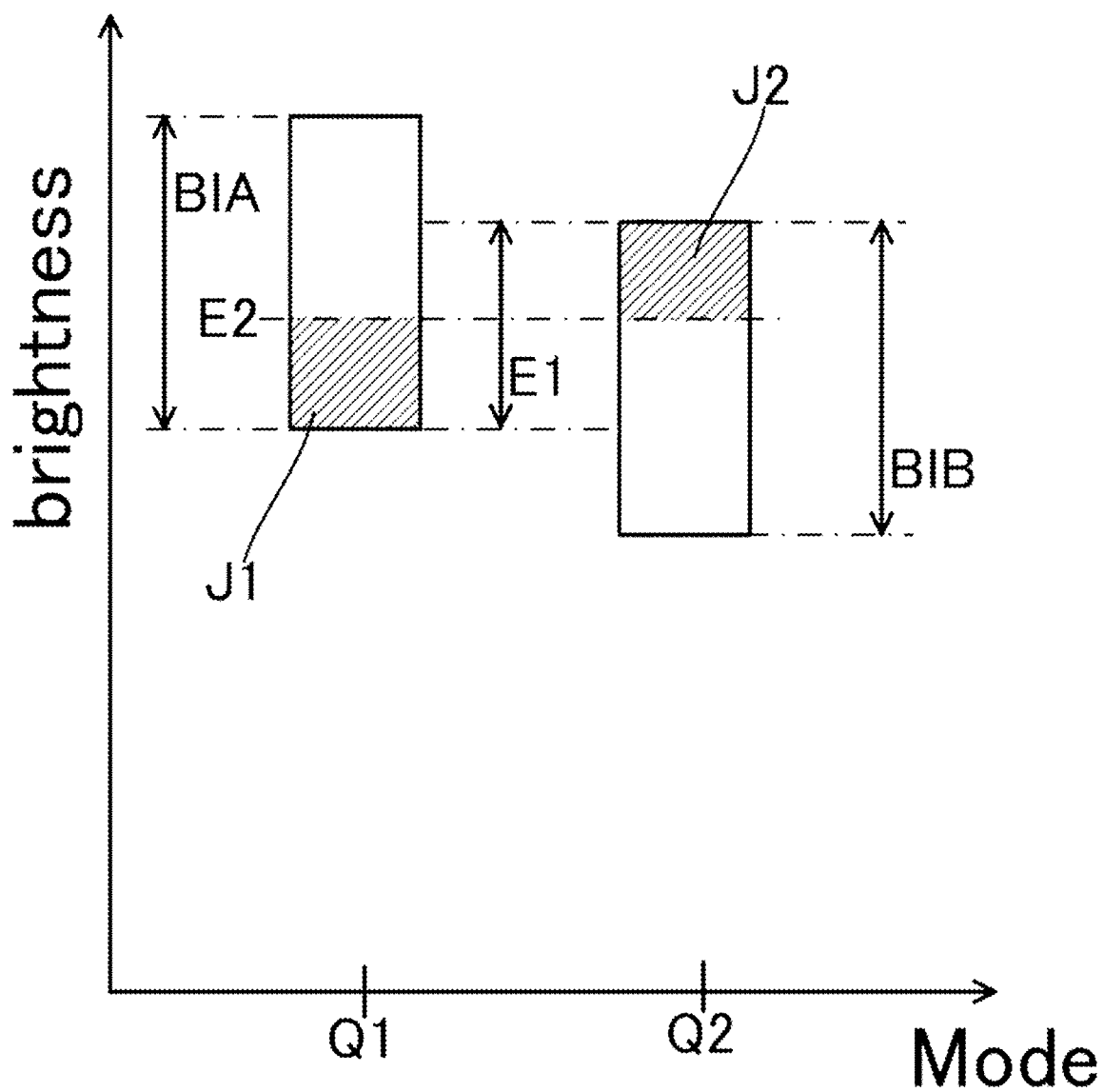
FIG. 21 is an enlarged diagram of a part of FIG. 12 according to the embodiment of the present disclosure.

As illustrated in FIG. 21, an overlapping region E1 in which the luminance range BlA of the control mode Q1 and the luminance range BlB of the control mode Q2 overlap is specified. Then, a mode switching value E2 is set in the non-end portion of the overlapping region E1. The mode switching value E2 is set, for example, to the median value of the overlapping region E1. The unused range J1 is set in the range of the luminance range BlA of the control mode Q1, that is the mode switching value E2 or lower. The unused range J2 is set in the range of the luminance range BlB of the control mode Q2, that is the mode switching value E2 or higher.

In the state of controlling the light sources 11r, 11g, and 11b in the control mode Q1, when the required luminance decreases and reaches the mode switching value E2, the second control unit 200 shifts from the control mode Q1 to the control mode Q2. Further, in the state of controlling the light sources 11r, 11g, and 11b in the control mode Q2, when the required luminance increases and reaches the mode switching value E2, the second control unit 200 shifts from the control mode Q2 to the control mode Q1.

The second control unit 200 turns ON each micromirror 30a of the DMD display element 30 in the display period Ton and turns OFF each micromirror 30a in the non-display period Tof. The second control unit 200 can adjust the luminance of the display light L by the DMD duty ratio of the DMD display element 30. The DMD duty ratio is calculated as the ratio of the total time of the display period Ton to one cycle.

Figure 22:
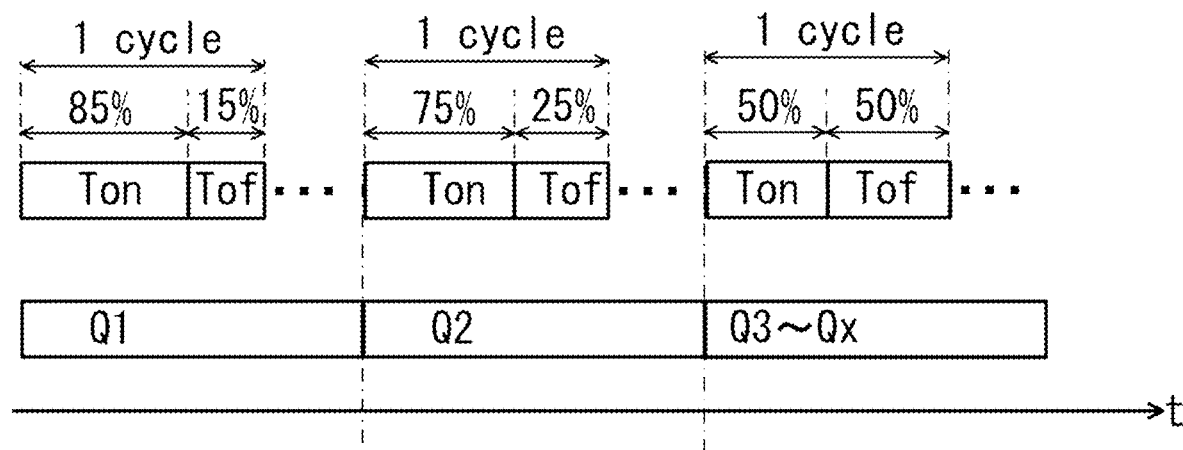
FIG. 22 is a diagram illustrating a control mode and a DMD duty ratio according to the embodiment of the present disclosure.
Figure 23:
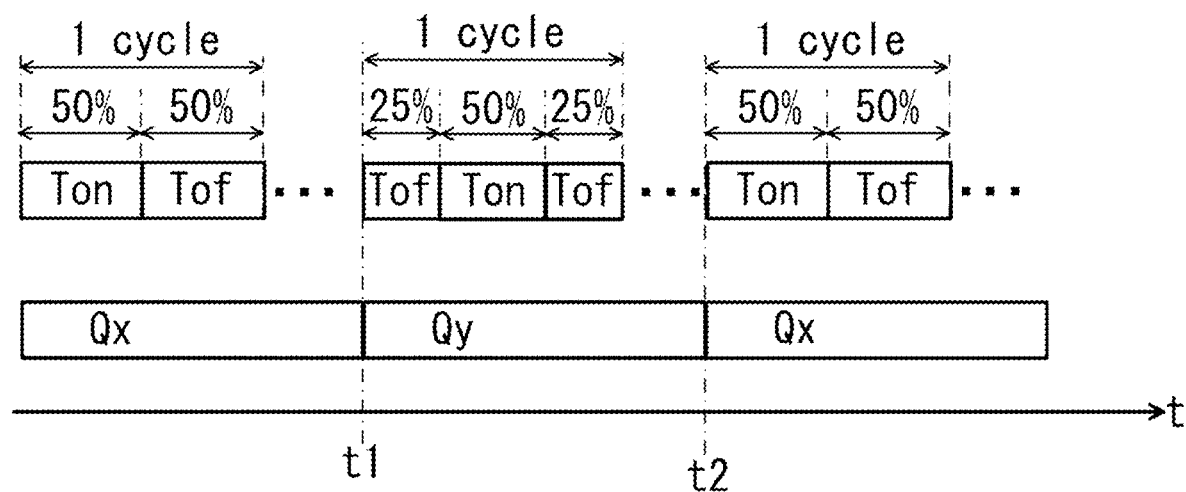
FIG. 23 is a diagram illustrating a control mode and a DMD duty ratio according to the embodiment of the present disclosure.

As illustrated in FIGS. 22 and 23, in the high-luminance mode, that is, in the control modes Q1 to Qx, the display period Ton is set in the first half of one cycle, and the non-display period Tof is set in the second half of one cycle. In the low-luminance mode, that is, in the control modes Qy to Qn, the non-display period Tof is set at the beginning and the end of one cycle, and the display period Ton is set so as to be sandwiched between the first and last display period Ton.

As illustrated in FIG. 22, the second control unit 200 sets the DMD duty ratio to 85% in the control mode Q1, sets the DMD duty ratio to 75% in the control mode Q2, and sets the DMD duty ratio to 50% in the control mode Q3 to Qn. In this way, the DMD duty ratio of the control mode Q2 is set to a value between the DMD duty ratio of the control mode Q1 and the DMD duty ratio of the control mode Q3, for example, the median value between the DMD duty ratio of the control mode Q1 and the DMD duty of the control mode Q3. As a result, when the mode is switched between the control modes Q1, Q2 and Q3, the DMD duty ratio is suppressed from suddenly changing, and thus, when the mode is switched between the control modes Q1 and Qn, the sudden change in the luminance of the display light L is suppressed, and the flicker of the virtual image V is suppressed.

As illustrated at time t1 in FIG. 23, when the control mode is switched from the control mode Qx, which belongs to the high-luminance mode, to the control mode Qy, which belongs the low-luminance mode, the non-display period Tof is set at the beginning of one cycle in the control mode Qy. As a result, it is possible to prevent the luminance of the display light L from being instantaneously increased when the control mode Qx is switched to the control mode Qy. Further, as illustrated at time t2 in FIG. 23, when the control mode is switched from the control mode Qy, which belongs to the low-luminance mode, to the control mode Qx, which belongs the high-luminance mode, the display period Ton is set in the first half of one cycle in the control mode Qx. As a result, it is possible to prevent the luminance of the display light L from being instantaneously decreased when the control mode Qy is switched to the control mode Qx.

In this example, the positions of the display period Ton and the non-display period Tof in one cycle are different between the control modes Q1 to Qx in the high-luminance mode and the control modes Qy to Qn in the low-luminance mode. However, not limited to this, the phases of the waveforms of the currents Ir, Ig, and Ib may be shifted between the control modes Q1 to Qx in the high-luminance mode and the control modes Qy to Qn in the low-luminance mode, to suppress the luminance of the display light L from being instantaneously changed between the control mode Qy and the control mode Qx.

Further, the second control unit 200 supplies a plurality of rectangular waves of currents Ir, Ig, and Ib each having a different width (period Ti in FIG. 18) to the light sources 11*r*, 11*g*, and 11*b* in the display period Ton. In doing so, the second control unit 200 may arrange a rectangular wave having a long width among the rectangular waves of the currents Ir, Ig, and Ib at the rear end portion of the display period Ton in either the high-luminance mode or the low-luminance mode.

Apart of the control content of the first control unit 100 may be executed by the second control unit 200, and conversely, a part of the control content of the second control unit 200 may be executed by the first control unit 100. Further, the first and second control units 100 and 200 may be configured as one control unit.

Advantageous Effect

According to the embodiment described above, the following advantageous effects are exhibited.

(1-1) A lighting control data generation method for generating the lighting control data Dm for controlling a plurality of light sources 11*r*, 11*g*, and 11*b* in a HUD device includes a measurement point specification step S25*a* of specifying a plurality of measurement points P1 to Pn, Pm in accordance with a luminance of light emitted by the light sources 11*r*, 11*g*, and 11*b* at each of a plurality of output levels set to different values by the light source control unit 201 that controls the light sources 11*r*, 11*g*, and 11*b* with reference to the provisional lighting control data Dm, and an output characteristic acquisition step S25*b* of generating the lighting control data Dm by interpolating between the specified plurality of measurement points P1 to Pn, Pm thereby obtaining the RGB output characteristics. In the measurement point specification step S25*a*, in the high-luminance mode in which the required luminance exceeds the threshold value, a first specified number n of measurement points P1 to Pn are specified, and in the low-luminance mode in which the required luminance is less than or equal to the threshold value, a second specified number m of measurement points P1 to Pm that are larger than the first specified number n of measurement points P1 to Pn are specified.

According to this configuration, the number of measurement points P1 to Pn in the high-luminance mode is set to be smaller than the number of measurement points P1 to Pm in the low-luminance mode. Accordingly, the process of specifying the measurement points P1 to Pn, Pm in the measurement point specification step S25*a* can be completed in a short time. Consequently, the time required to generate the lighting control data Dm can be reduced.

In the high-luminance mode, the relation between the output level of the light source control unit 201 and the luminance changes linearly. Therefore, even if the number of measurement points P1 to Pn in the high-luminance mode is reduced, the influence on the polygonal lines Lr, Lg, and Lb indicating the RGB output characteristics is small, and the reliability of the lighting control data Dm is ensured. On the other hand, in the low-luminance mode, the relation between the output level of the light source control unit 201 and the luminance changes curvilinearly. Therefore, it is preferable that the number of measurement points P1 to Pm in the low-luminance mode is greater from the perspective of ensuring the reliability of the lighting control data Dm.

(1-2) In the output characteristic acquisition step S25*b*, in the high-luminance mode in which the required luminance exceeds the threshold value, linear interpolation is performed between the first specified number n of measurement points P1 to Pn, and in the low-luminance mode in which the required luminance is equal to or less than the threshold value, curve interpolation is performed between the second specified number m of measurement points P1 to Pm.

According to this configuration, in the high-luminance mode, the relation between the output level of the light source control unit 201 and the luminance changes linearly, and therefore the reliability of the lighting control data Dm is enhanced by performing linear interpolation between the measurement points P1 to Pn.

On the other hand, in the low-luminance mode, the relation between the output level of the light source control unit 201 and the luminance changes curvilinearly, and therefore the reliability of the lighting control data Dm is enhanced by performing curve interpolation between the measurement points P1 to Pm.

(1-3) In the measurement point specification step S25*a*, in the high-luminance mode in which the required luminance exceeds the threshold value, luminance of light emitted by any of the light sources 11*r*, 11*g*, and 11*b* is measured for a first measurement count N1 at the output level set by the light source control unit 201, and the measurement points P1 to Pn are specified by averaging the luminance measured for the first measurement count N1, and in the low-luminance mode in which the required luminance is equal to or less than the threshold value, the luminance of the light emitted by any of the light sources 11*r*, 11*g*, and 11*b* is measured for a second measurement count N2 that is larger than the first measurement count N1 at the output level set by the light source control unit 201, and the measurement points P1 to Pm are specified by averaging the luminance measured for the second measurement count N2. In the low-luminance mode, a slight change in luminance has a greater effect on the visibility of the virtual image V than in the high-luminance mode. Therefore, by increasing the number of measurements in the low-luminance mode to be larger than the number of measurements in the high-luminance mode, the accuracy of the measurement points P1 to Pn in the low-luminance mode can be improved, and the visibility of the virtual image V can be improved.

(1-4) The lighting control data Dm includes a plurality of control modes Q1 to Qn according to the required luminance. In the output characteristic acquisition step S25b, for each of the plurality of control modes Q1 to Qn, RGB output characteristics are acquired. In the measurement point specification step S25a, any one of the plurality of filters F0 to F4 having mutually different light attenuation rates is used as the selected filter Fs, and the light of the illumination light C or the display light L based on the light emitted by any of the light sources 11r, 11g, and 11b is thereby attenuated in such a manner that the light is within a range measurable by the lightmeter 803, and when acquiring the RGB output characteristics in order from the control mode Q1 to Qn having a highest required luminance, the plurality of filters F0 to F4 are switched to be the selected filter Fs in descending order of the light attenuation rate, that is, in order of filter F0, filter F1, filter F2, filter F3, and filter F4. According to this configuration, when acquiring the RGB output characteristics, the order of switching to the selected filter Fs in the filters F0 to F4 can be simplified. Accordingly, the time required to switch the selected filter Fs can be reduced, and the luminance is quickly measured by the lightmeter 803. Consequently, the time required to generate the lighting control data Dm can be reduced.

(1-5) In the measurement point specification step S25a, when specifying the measurement points P1 to Pn, Pm related to the luminance of specific target light (e.g., red light) emitted by a specific target light source (e.g., the light source 11r) among the plurality of light sources 11r, 11g, and 11b, while lighting up the plurality of light sources 11r, 11g, and 11b in order, the specific target light from the specific target light source is reflected toward the transmissive screen 50 through the DMD display element 30, and the light (e.g., green light and blue light) from the light sources (e.g., the light sources 11g and 11b) other than the specific target light source among the plurality of light sources 11r, 11g, and 11b is reflected in a direction different from the direction of the transmissive screen 50.

According to this configuration, by illuminating light sources other than the specific target light source, the luminance of the specific target light can be measured in conditions close to the actual use of the HUD device 1. Accordingly, the measurement points P1 to Pn, Pm can be specified with higher precision. For example, also when measuring the luminance of the specific target light (e.g., red light) in order to specify the measurement points P1 to Pn, Pm, it is assumed that the chromaticity of the specific target light (red light) changes under the influence of light of a color other than the specific target light (e.g., green light and blue light). According to the above configuration, the measurement points P1 to Pn, Pm can be specified in consideration of the influence of light of a color other than the specific target light.

(1-6) The lighting control data generation device 800 generates the lighting control data Dm for controlling the plurality of light sources 11r, 11g, and 11b in the HUD device 1. The lighting control data generation device 800 includes the measurement point specification unit 205c that specifies the plurality of measurement points P1 to Pn in accordance with a luminance of light emitted from the light sources 11r, 11g, and 11b at each of a plurality of output levels set to different values by the light source control unit 201 that controls the light sources 11r, 11g, and 11b with reference to the lighting control data Dm, and the output characteristic acquisition unit 205d that generates the lighting control data Dm by interpolating between the specified plurality of measurement points P1 to Pn, Pm thereby obtaining the RGB output characteristics. The measurement point specification unit 205c specifies a first specified number n of measurement points P1 to Pn in the high-luminance mode in which the required luminance exceeds the threshold value, and specifies a second specified number m of measurement points P1 to Pm that are larger than the first specified number n of measurement points P1 to Pn in the low-luminance mode in which the required luminance is less than or equal to the threshold value.

According to this configuration, as described above, the time required to generate the lighting control data Dm can be reduced.

(2-1) The HUD device 1 includes the plurality of light sources 11r, 11g, and 11b, the light source driver 300 that drives the light sources 11r, 11g, and 11b, the second control unit 200, which is an example of the control unit that lights up the plurality of light sources 11r, 11g, and 11b via the light source driver 300 on the basis of the lighting control data Dm, and the DMD display element 30 that generates the display light L on the basis of the illumination light C emitted by the plurality of light sources 11r, 11g, and 11b. The lighting control data Dm includes the control mode Q1 which is an example of the first control mode and the control mode Q2 which is an example of the second control mode for generating the illumination light C having a luminance according to a required luminance. The control modes Q1 and Q2 have different luminance ranges B1A and B1B a part of which overlaps each other. When the required luminance reaches the mode switching value E2 located at the non-end portion of the overlapping region E1 where the luminance range B1A of the control mode Q1 and the luminance range B1B of the control mode Q2 overlap, the second control unit 200 switches the mode between the control modes Q1 and Q2. The end portion of the luminance range B1 of each control mode Q1 to Qn is a region with low accuracy that can achieve a desired color, for example, white illumination light C. According to the above configuration, by setting the mode switching value E2 in the non-end portion of the overlapping region E1, the end portions of the luminance ranges B1A and B1B of the control modes Q1 and Q2 are set in the unused range J. Accordingly, the luminance of the illumination light C can be varied in accordance with the required luminance while achieving the illumination light C of a desired color (e.g., white). Accordingly, the visibility of the virtual image V is enhanced.

(2-2) The mode switching value E2 is set to the median value of the overlapping region E1.

According to this configuration, for example, the unused ranges J1 and J2 of the two control modes Q1 and Q2 can be set to the same length.

(2-3) The HUD device 1 includes the transmissive screen 50 that receives the display light L from the DMD display element 30 and displays the image M. The DMD display element 30 includes the plurality of micromirrors 30a provided corresponding to the pixels of the image M. Each micromirror 30a switches between the ON state where the light from the light sources 11r, 11g, and 11b is reflected toward the transmissive screen 50 under the control of the second control unit 200, and the OFF state where the light from the light sources 11r, 11g, and 11b is reflected in a direction different from the direction of the transmissive screen 50. The median value of the luminance range B1A of the control mode Q1 is set to be larger than the median value of the luminance range B1B of the control mode Q2 and the median value of the luminance range B1 of the control mode Q3 which is an example of the third control mode. The median value of the luminance range B1B of the control mode Q2 is set to be smaller than the median value of the luminance range B1A of the control mode Q1 and larger than the median value of the luminance range B1A of the control mode Q3. The second control unit 200 changes the DMD duty ratio, which is the period during which the micromirror 30a in one cycle is in the ON state, thereby adjusting the luminance of the display light L. The DMD duty ratio of the control mode Q1 is set to be larger than the DMD duty ratio of the control mode Q2 and the DMD duty ratio of the control mode Q3. The DMD duty ratio of the control mode Q2 is set to be larger than the DMD duty ratio of the control mode Q3 and smaller than the DMD duty ratio of the control mode Q1. According to this configuration, when the mode is switched between the control modes Q1, Q2, and Q3, the DMD duty ratio is suppressed from suddenly changing. This suppresses sudden changes in the luminance of the display light L due to changes in the required luminance. Accordingly, the visibility of the virtual image V is enhanced.

The present disclosure is not limited to the above embodiment and drawings. Modifications (including deletion of components) may be made as appropriate as long as the scope of this disclosure is not changed. An example of modifications will be explained below.

(Modifications)

In the above embodiment, the correction values based on the comparison of the optimum master data Mx at room temperature and the comparison data Mc are also used to correct the optimum master data Mx at a temperature other than room temperature. However, the present invention is not limited to this, and a correction value at each temperature may be acquired and the correction value may be applied to the master data Mx at each temperature.

In the above embodiment, the output characteristic acquisition unit 205d takes into account the acquired gain deviation information to acquire the RGB output characteristics at room temperature in the shipment product projector device 18k. However, the gain deviation information does not have to be taken into account.

In the above embodiment, the HUD device 1 is for in-vehicle use, but not limited to in-vehicle use and may be mounted on airplanes, ships, and other vehicles. Further, the display light L from the HUD device 1 is projected onto the windshield 3, but may be projected onto a dedicated combiner.

In the above embodiment, the second control unit 200 shifts to either the high-luminance mode or the low-luminance mode on the basis of the required luminance signal SL indicating the light intensity of the ambient light. However, the present invention is limited to this, and the viewer 4 may operate an operation unit (not illustrated) provided in the HUD device 1 or the vehicle 2 to change the required luminance, and the second control unit 200 may shift between the above modes.

The variable ND filter devices 804 and 814 in the above embodiment may be omitted.

In the above embodiment, the master data generation unit 802 sets the same number of measurement points for both low-luminance mode and high-luminance mode. However, the present invention is not limited to this, similarly to the product data generation unit 205, the number of measurement points in the low-luminance mode may be set to be larger than the number of measurement points in the high-luminance mode.

In the above embodiment, the mode switching value E2 is set to the median value of the overlapping region E1, but may be set to a value other than the median value of the overlapping region E1 as long as the mode switching value E2 is within the overlapping region E1.

In the above embodiment, the number of measurements in the low-luminance mode (the second measurement count N2) is set to be larger than the number of measurements in the high-luminance mode (the first measurement count N1). However, the present invention is not limited to this, the number of measurements may be set to the same number between the low-luminance mode and the high-luminance mode. Further, the number of measurements may be singular, not limited to multiple measurements. If the number of measurements is singular, luminance is not averaged.

The number and arrangement of the five filters F0 to F4 of the variable ND filter device 804 in the above embodiment can be appropriately changed. Further, the rotation direction Cw of the rotary plate 804a is not limited to the counterclockwise direction, but may also be the clockwise direction.

The measurement point specification units 205c and 802a in the above embodiment turn each micromirror 30a of the DMD display element 30 to the OFF state during the period when the light sources other than the light source to be measured are lit, however, may turn off the light sources other than the light source to be measured.

In the above embodiment, the DMD duty ratio is changed in three stages between the control mode Q1, the control mode Q2, and the control modes Q3 to Qn. However, the present invention is not limited to this, and the DMD duty ratio may be changed in four stages or more between the control modes Q1 to Qn, or the DMD duty ratio may be changed in two stages. Further, the DMD duty ratio may be kept constant without changing between the control modes Q1 to Qn.

In the above embodiment, two types of specified number are set, the first specified number n in the high-luminance mode and the second specified number m in the low-luminance mode, but three or more types of specified number may be set. In this case, the specified number may be set to increase as the required luminance decreases.

In the above embodiment, as illustrated in FIG. 23, the arrangement forms of the display period Ton and the non-display period Tof in one cycle are different between the control modes Q1 to Qx in the high-luminance mode and the control modes Qy to Qn in the low-luminance mode, but may be the same.

DESCRIPTION OF REFERENCE NUMERALS

1 HUD device
2 vehicle
3 windshield
4 viewer
5 light source drive device
7 illuminance sensor
10 lighting device
11 light source group 11b, 11g, 11r light source
13 light combining unit
13a reflective mirror
13b, 13c dichroic mirror
15 prism
15a inclined surface
15b, 15c orthogonal surface
18 projector device
18a to 18j sample projector device
18k shipment product projector device
19 display unit
30 DMD display element
30a micromirror
40 projection optical system
43 light source drive unit
49 voltage detection unit
50 transmissive screen
54, 55, 61 plane mirror
62 concave mirror
65 concave mirror drive unit
70 housing
70a opening
71 light transmission section
100 first control unit
200 second control unit
201 light source control unit
201a gain setting unit
202 display element control unit
203, 807 storage unit
205 product data generation unit
205a drive capability determination unit
205b master data selection unit
205c measurement point specification unit
205d output characteristic acquisition unit
205e data correction unit
300 light source driver
500 light intensity detection unit
600 light source temperature detection unit
700 video signal input unit
800 lighting control data generation device
801 sample product data acquisition device
802 master data generation unit
802a measurement point specification unit
802b output characteristic acquisition unit
803 lightmeter
803 meter
804 variable ND filter device
F0 to F4 filter
804a rotary plate
804b irradiation range
804c rotation drive unit
805 thermostatic chamber glass
806 room temperature adjustment unit
808 thermostatic chamber
809 inspection light emission unit
810 shipment product data acquisition device
813 lightmeter
814 variable ND filter device
818 chamber
819 inspection light emission unit
R red light
B blue light
G green light
C illumination light
C1 capacitor
G1 to G10 grade
L display light
M image
L1 inductor
M1 to M10 master data
Mc comparison data
Mx optimum master data
P pulse
Q1 to Qn, Qa, Qb, Qc, Qd, Qx, Qy control mode
V virtual image
SE video signal
SL required luminance signal
SFB light intensity detection signal
Ir, Ig, Ib current
Df1, Df2 difference value
ST light source temperature signal
Bl, Bl1, Bl2, BlA, BlB luminance range
Lb, Lg, Lr polygonal line
SV voltage detection signal
Dm lighting control data
Tr, Tg, Tb lighting-up permission period
Ax rotation axis
Ay rotation axis
P1 to Px, Pm, Pn measurement point
Pk peak value
Swa, Swb, Swc, Swg, Swr switch section
Ton display period
Tof non-display period
J1, J2, J unused range
E1 overlapping region
E2 mode switching value

The invention claimed is:

1. A lighting control data generation method for generating lighting control data for controlling a plurality of light sources in a head-up display device, the lighting control data generation method comprising:
a measurement point specification step in which a measurement point specification unit specifies a plurality of measurement points in accordance with a luminance of light emitted by the light sources at each of a plurality of output levels set to mutually different values by a light source control unit that controls the light sources with reference to the lighting control data; and
an output characteristic acquisition step in which an output characteristic acquisition unit acquires output characteristics by interpolating between the specified plurality of measurement points,
wherein in the measurement point specification step, when a required luminance exceeds a threshold value, a first specified number of measurement points are specified, and when the required luminance is less than or equal to the threshold value, a second specified number of measurement points that are larger than the first specified number of measurement points are specified.

2. The lighting control data generation method according to claim 1, wherein in the output characteristic acquisition step, when the required luminance exceeds the threshold value, linear interpolation is performed between the first specified number of measurement points, and when the required luminance is equal to or less than the threshold value, curve interpolation is performed between the second specified number of measurement points.

3. The lighting control data generation method according to claim 1, wherein in the measurement point specification step, when the required luminance exceeds the threshold value, the luminance of the light emitted by the light sources is measured for a first measurement count at the set output levels, and one measurement point is specified by averaging the luminance measured for the first measurement count, and when the required luminance is equal to or less than the threshold value, the luminance of the light emitted by the light source is measured for a second measurement count that is larger than the first measurement count at the set output levels, and one measurement point is specified by averaging the luminance measured for the second measurement count.

4. The lighting control data generation method according to claim 1,
wherein the lighting control data includes a plurality of control modes according to the required luminance,
wherein each of the plurality of control modes includes the output characteristics,
wherein in the output characteristic acquisition step, the output characteristics are acquired for each of the plurality of control modes, and
wherein in the measurement point specification step, any one of a plurality of filters having mutually different light attenuation rates is used as a selected filter, and the light emitted by the light sources is thereby attenuated in such a manner that the luminance of the light emitted by the light sources is within a range measurable by a lightmeter, and when acquiring the output characteristics in order from the control mode having a highest required luminance, the plurality of filters are switched to be the selected filter in descending order of the light attenuation rate.

5. The lighting control data generation method according to claim 1, wherein in the measurement point specification step, when specifying the measurement point related to the luminance of specific target light emitted by a specific target light source among the plurality of light sources, while lighting up the plurality of light sources in order, the specific target light from the specific target light source is reflected toward a transmissive screen through a DMD display element, and the light from light sources other than the specific target light source among the plurality of light sources is reflected in a direction different from a direction of the transmissive screen.

6. A lighting control data generation device for generating lighting control data for controlling a plurality of light sources in a head-up display device, the lighting control data generation device comprising:
a measurement point specification unit that specifies a plurality of measurement points in accordance with a luminance of light emitted by the light sources at each of a plurality of output levels set to mutually different values by a light source control unit that controls the light sources with reference to the lighting control data; and
an output characteristic acquisition unit that acquires output characteristics by interpolating between the specified plurality of measurement points,
wherein when a required luminance exceeds a threshold value, the measurement point specification unit specifies a first specified number of measurement points, and when the required luminance is less than or equal to the threshold value, the measurement point specification unit specifies a second specified number of measurement points that are larger than the first specified number of measurement points.

* * * * *